US012642301B2

(12) United States Patent
Batista et al.

(10) Patent No.: US 12,642,301 B2
(45) Date of Patent: Jun. 2, 2026

(54) INDUCTIVE HEATING ARRANGEMENT WITH SEGMENTED INDUCTIVE HEATING ELEMENT

(71) Applicant: Philip Morris Products S.A., Neuchatel (CH)

(72) Inventors: Rui Nuno Batista, Neuchatel (CH); Ricardo Cali, Neuchatel (CH); Jerome Christian Courbat, Neuchatel (CH); Oleg Mironov, Neuchatel (CH); Enrico Stura, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 722 days.

(21) Appl. No.: 17/624,494

(22) PCT Filed: Jun. 25, 2020

(86) PCT No.: PCT/EP2020/067948
§ 371 (c)(1),
(2) Date: Jan. 3, 2022

(87) PCT Pub. No.: WO2021/001267
PCT Pub. Date: Jan. 7, 2021

(65) Prior Publication Data

US 2022/0386698 A1 Dec. 8, 2022

(30) Foreign Application Priority Data

Jul. 4, 2019 (EP) .................................... 19184536

(51) Int. Cl.
*A24F 40/465* (2020.01)
*A24D 1/20* (2020.01)
(Continued)

(52) U.S. Cl.
CPC .............. *A24F 40/465* (2020.01); *A24D 1/20* (2020.01); *A24F 40/20* (2020.01); *H05B 6/105* (2013.01); *H05B 6/44* (2013.01)

(58) Field of Classification Search
CPC ......... A24D 1/20; A24F 40/20; A24F 40/465; H05B 6/44; H05B 6/105
See application file for complete search history.

(56) References Cited

U.S. PATENT DOCUMENTS

2001/0009595 A1* 7/2001 Okuno .................. G02B 6/125 385/11
2009/0255571 A1* 10/2009 Xia ...................... H01L 31/049 156/286
(Continued)

FOREIGN PATENT DOCUMENTS

CA 3 078 860 A1 4/2019
CN 103750566 A 4/2014
(Continued)

OTHER PUBLICATIONS

International Search Report and Written Opinion issued on Sep. 28, 2020 in PCT/EP2020/067948 filed on Jun. 25, 2020.
(Continued)

*Primary Examiner* — Michael H. Wilson
*Assistant Examiner* — Adam Z Baratz
(74) *Attorney, Agent, or Firm* — Oblon, McClelland, Maier & Neustadt, L.L.P.

(57) ABSTRACT

An inductive heating element for an aerosol-generating system is provided, the inductive heating element including: a first susceptor, the first susceptor being a tubular susceptor defining an inner cavity configured to receive an aerosol-forming substrate; a second susceptor, the second susceptor being a tubular susceptor defining an inner cavity configured to receive aerosol-forming substrate; and a separation between the first susceptor and the second susceptor, the
(Continued)

separation thermally insulating the first susceptor from the second susceptor. An inductive heating arrangement, an aerosol-generating device, and an aerosol-generating system are also provided.

20 Claims, 7 Drawing Sheets

(51) Int. Cl.

| | |
|---|---|
| ***A24F 40/20*** | (2020.01) |
| ***H05B 6/10*** | (2006.01) |
| ***H05B 6/44*** | (2006.01) |

(56) References Cited

U.S. PATENT DOCUMENTS

| | | | | |
|---|---|---|---|---|
| 2015/0181934 | A1 | 7/2015 | Lyubomirskiy et al. | |
| 2016/0338643 | A1* | 11/2016 | Yoshioka | G01N 33/66 |
| 2018/0192701 | A1* | 7/2018 | Stoner | A61M 15/0025 |
| 2018/0352858 | A1 | 12/2018 | Rojo-Calderon | |
| 2019/0191767 | A1 | 6/2019 | Wu et al. | |
| 2020/0367565 | A1* | 11/2020 | Batista | H05B 6/105 |
| 2022/0361558 | A1* | 11/2022 | Rojo-Calderon | H05B 6/108 |

FOREIGN PATENT DOCUMENTS

| | | | | |
|---|---|---|---|---|
| CN | 103783668 | A | 5/2014 | |
| CN | 104095291 | A | 10/2014 | |
| CN | 106617325 | A | 5/2017 | |
| CN | 108135278 | A | 6/2018 | |
| CN | 108887748 | A | 11/2018 | |
| CN | 109640716 | A | 4/2019 | |
| EP | 2 994 000 | B1 | 9/2016 | |
| EP | 3 506 721 | A1 | 7/2019 | |
| JP | 2018-527889 | A | 8/2018 | |
| JP | 2018-537077 | A | 12/2018 | |
| JP | 2018-537957 | A | 12/2018 | |
| JP | 2019-526247 | A | 9/2019 | |
| JP | 2020-529842 | A | 10/2020 | |
| KR | 10-2018-0040522 | A | 4/2018 | |
| KR | 10-2019-0016907 | A | 2/2019 | |
| RU | 2 643 421 | C2 | 2/2018 | |
| RU | 2 670 534 | C1 | 10/2018 | |
| WO | WO 95/27411 | A1 | 10/1995 | |
| WO | WO 2015/131058 | A1 | 9/2015 | |
| WO | WO 2017/001819 | A1 | 1/2017 | |
| WO | WO 2017/068095 | A1 | 4/2017 | |
| WO | WO 2018/041450 | A1 | 3/2018 | |
| WO | WO 2018/146071 | A1 | 8/2018 | |
| WO | WO 2018/211035 | A1 | 11/2018 | |
| WO | WO 2019/003000 | A1 | 1/2019 | |
| WO | WO 2019/030361 | A1 | 2/2019 | |
| WO | WO-2019030364 | A1 * | 2/2019 | A24F 40/465 |

OTHER PUBLICATIONS

Japanese Office Action issued Jul. 1, 2024 in Japanese Patent Application No. 2021-576281 (with English Translation), 11 pages.
Combined Chinese Office Action and Search Report issued on Oct. 23, 2023 in Russian Patent Application No. 2022101810 (with unedited computer-generated English translation), 19 pages.
Japanese Office Action issued Oct. 15, 2024 in Japanese Patent Application No. 2021-576281 (with unedited computer-generated English Translation), 6 pages.
Combined Chinese Office Action and Search Report issued on Dec. 30, 2024 in Chinese Patent Application No. 202080046960.5 (with English translation), 24 pages.
Combined Chinese Office Action and Search Report issued Jul. 22, 2025, in corresponding Chinese Patent Application No. 202080046960.5 (with English Translation), 28 pages.
"Electrical Manufacturing Technology (2nd Edition)", Edited by Meng Qinglong, Machinery Industry Press, p. 164, Oct. 31, 1982, 3 pages.
Office Action dated Jan. 27, 2026, issued in corresponding Chinese patent application No. 202080046960.5 (with English translation).

* cited by examiner

INDUCTIVE HEATING ARRANGEMENT WITH SEGMENTED INDUCTIVE HEATING ELEMENT

The present disclosure relates to an inductive heating element for an aerosol-generating system, an inductive heating arrangement for an aerosol-generating system, an aerosol-generating device with an inductive heating arrangement, and an aerosol-generating system with an aerosol-generating device having an inductive heating arrangement.

A number of electrically-operated aerosol-generating systems in which an aerosol-generating device having an electric heater is used to heat an aerosol-forming substrate, such as a tobacco plug, have been proposed in the art. One aim of such aerosol-generating systems is to reduce known harmful smoke constituents of the type produced by the combustion and pyrolytic degradation of tobacco in conventional cigarettes. Typically, the aerosol-generating substrate is provided as part of an aerosol-generating article which is inserted into a cavity in the aerosol-generating device. In some known systems, to heat the aerosol-forming substrate to a temperature at which it is capable of releasing volatile components that can form an aerosol, a resistive heating element such as a heating blade is inserted into or around the aerosol-forming substrate when the article is received in the aerosol-generating device. In other aerosol-generating systems, an inductive heater is used rather than a resistive heating element. The inductive heater typically comprises an inductor coil forming part of the aerosol-generating device and a susceptor arranged such that it is in thermal proximity to the aerosol-forming substrate. The inductor generates a varying magnetic field to generate eddy currents and hysteresis losses in the susceptor, causing the susceptor to heat up, thereby heating the aerosol-forming substrate. Inductive heating allows aerosol to be generated without exposing the heater to the aerosol-generating article. This can improve the ease with which the heater may be cleaned.

Some known aerosol-generating devices comprise more than one inductor coil, each inductor coil being arranged to heat a different portion of a susceptor. Such an aerosol-generating devices may be used to heat different portions of an aerosol-generating article at different times, or to different temperatures. However, it can be difficult for such aerosol-generating devices to heat one portion of an aerosol-generating article without also indirectly heating an adjacent portion of the aerosol-generating article.

It would be desirable to provide an aerosol-generating device that mitigates or overcomes these problems with known systems.

According to this disclosure, there is provided an inductive heating element for an aerosol-generating system. The inductive heating element may comprise a first susceptor. The first susceptor may be a tubular susceptor defining an inner cavity for receiving aerosol-forming substrate. The inductive heating element may comprise a second susceptor. The second susceptor may be a tubular susceptor defining an inner cavity for receiving aerosol-forming substrate. The inductive heating element may further comprise a separation between the first susceptor and the second susceptor. The separation may thermally insulate the first susceptor from the second susceptor.

According to this disclosure, there is provided an inductive heating element for an aerosol-generating system, the inductive heating element comprising: a first susceptor, the first susceptor being a tubular susceptor defining an inner cavity for receiving aerosol-forming substrate; a second susceptor, the second susceptor being a tubular susceptor defining an inner cavity for receiving aerosol-forming substrate; and a separation between the first susceptor and the second susceptor, the separation thermally insulating the first susceptor from the second susceptor.

Providing an inductive heating element with a separation between a first susceptor and a second susceptor may reduce heat transfer, via conduction, between the first susceptor and the second susceptor compared with an inductive heating element comprising a single susceptor of the same length. This may improve the ability of an inductive heating element to selectively heat discrete portions of an aerosol-forming substrate.

According to this disclosure, there is provided an inductive heating arrangement for an aerosol-generating system.

The inductive heating arrangement may comprise an inductive heating element. The inductive heating element may comprise a first susceptor. The first susceptor may be a tubular susceptor defining an inner cavity for receiving aerosol-forming substrate. The inductive heating element may comprise a second susceptor. The second susceptor may be a tubular susceptor defining an inner cavity for receiving aerosol-forming substrate. The inductive heating element may further comprise a separation between the first susceptor and the second susceptor. The separation may thermally insulate the first susceptor from the second susceptor.

The inductive heating arrangement may further comprise a first inductor coil. The inductive heating arrangement may further comprise a second inductor coil. The first inductor coil may be arranged relative to the inductive heating element such that a varying electric current supplied to the first inductor coil generates a varying magnetic field that heats the first susceptor of the inductive heating element. The second inductor coil may be arranged relative to the inductive heating element such that a varying electric current supplied to the second inductor coil generates a varying magnetic field that heats the second susceptor of the inductive heating element.

In particular, according to this disclosure there is provided an inductive heating arrangement for an aerosol-generating system, the inductive heating arrangement comprising: an inductive heating element, a first inductor coil and a second inductor coil. The inductive heating element comprises: a first susceptor, the first susceptor being a tubular susceptor defining an inner cavity for receiving aerosol-forming substrate; a second susceptor, the second susceptor being a tubular susceptor defining an inner cavity for receiving aerosol-forming substrate; and a separation between the first susceptor and the second susceptor, the separation thermally insulating the first susceptor from the second susceptor. The first inductor coil is arranged relative to the inductive heating element such that a varying electric current supplied to the first inductor coil generates a varying magnetic field that heats the first susceptor of the inductive heating element. The second inductor coil is arranged relative to the inductive heating element such that a varying electric current supplied to the second inductor coil generates a varying magnetic field that heats the second susceptor of the inductive heating element.

Providing an inductive heating arrangement with a first inductor coil arranged to heat a first susceptor of an inductive heating element, and a second inductor coil arranged to heat a second susceptor of the inductive heating element enables selective heating of the first susceptor and the second susceptor. Such selective heating enables the inductive heating arrangement to heat different portions of an aerosol-forming substrate at different times, and may enable one of the susceptors to be heated to a different temperature than the other susceptor.

According to this disclosure, there is provided an aerosol-generating device comprising an inductive heating arrangement.

The inductive heating arrangement may comprise an inductive heating element. The inductive heating element may comprise a first susceptor. The first susceptor may be a tubular susceptor defining an inner cavity for receiving aerosol-forming substrate. The inductive heating element may comprise a second susceptor. The second susceptor may be a tubular susceptor defining an inner cavity for receiving aerosol-forming substrate. The inductive heating element may further comprise a separation between the first susceptor and the second susceptor. The separation may thermally insulate the first susceptor from the second susceptor.

The inductive heating arrangement may further comprise a first inductor coil. The inductive heating arrangement may further comprise a second inductor coil. The first inductor coil may be arranged relative to the inductive heating element such that a varying electric current supplied to the first inductor coil generates a varying magnetic field that heats the first susceptor of the inductive heating element. The second inductor coil may be arranged relative to the inductive heating element such that a varying electric current supplied to the second inductor coil generates a varying magnetic field that heats the second susceptor of the inductive heating element.

In particular, according to this disclosure there is provided an aerosol-generating device comprising a device housing defining a device cavity for receiving an aerosol-forming substrate. The aerosol-generating device further comprises an inductive heating arrangement including an inductive heating element, a first inductor coil and a second inductor coil. The inductive heating element comprises: a first susceptor disposed around a first portion of the device cavity; a second susceptor disposed around a second portion of the device cavity; and a separation between the first susceptor and the second susceptor, the separation thermally insulating the first susceptor from the second susceptor. The aerosol-generating device further comprises: a first inductor coil disposed around at least a portion of the first susceptor and the first portion of the device cavity; a second inductor coil disposed around at least a portion of the second susceptor and the second portion of the device cavity; and a power supply connected to the inductive heating arrangement and configured to provide a varying electric current to the first inductor coil and the second inductor coil. When the varying electric current is supplied to the first inductor coil, the first inductor coil generates a varying magnetic field which heats the first susceptor. When the varying electric current is supplied to the second inductor coil, the second inductor coil generates a varying magnetic field which heats the second susceptor.

Providing an aerosol-generating device with an inductive heating arrangement having a first susceptor disposed around a first portion of a device cavity, and a second susceptor disposed around a second portion of the device cavity may enable selective heating of the first portion of the device cavity by the first susceptor and the second portion of the device cavity by the second susceptor. Providing a first inductor coil arranged to heat the first susceptor, and a second inductor coil arranged to heat the second susceptor may enable selective heating of the first susceptor and the second susceptor. Such selective heating enables the inductive heating arrangement to heat different portions of an aerosol-forming substrate received in the device cavity, at different times, and to different temperatures. Advantageously, this may enable an aerosol-generating device to generate aerosols having different characteristics, increasing the functionality and flexibility of the aerosol-generating device.

According to this disclosure there is provided an aerosol-generating system. The aerosol-generating system comprises an aerosol-generating article comprising an aerosol-forming substrate, and an aerosol-generating device configured to receive at least a portion of the aerosol-generating article. The aerosol-generating article may comprise a first aerosol-forming substrate and a second aerosol-forming substrate. The aerosol-generating device may comprise an inductive heating arrangement. The inductive heating arrangement may comprise: an inductive heating element. The inductive heating element may comprise a first susceptor. The first susceptor may be a tubular susceptor defining an inner cavity for receiving aerosol-forming substrate. The inductive heating element may comprise a second susceptor. The second susceptor may be a tubular susceptor defining an inner cavity for receiving aerosol-forming substrate. The inductive heating element may further comprise a separation between the first susceptor and the second susceptor. The separation may thermally insulate the first susceptor from the second susceptor. The inductive heating arrangement may further comprise a first inductor coil. The inductive heating arrangement may further comprise a second inductor coil. The first inductor coil may be arranged relative to the inductive heating element such that a varying electric current supplied to the first inductor coil generates a varying magnetic field that heats the first susceptor of the inductive heating element. The second inductor coil may be arranged relative to the inductive heating element such that a varying electric current supplied to the second inductor coil generates a varying magnetic field that heats the second susceptor of the inductive heating element. The inductive heating arrangement may be arranged such that the first susceptor is positioned to heat the first aerosol-forming substrate of the aerosol-generating article when the aerosol-generating article is received in the aerosol-generating device. The inductive heating arrangement may be arranged such that the second susceptor is positioned to heat the second aerosol-forming substrate of the aerosol-generating article when the aerosol-generating article is received in the aerosol-generating device.

Advantageously, such an aerosol-generating system may be configured to selectively heat the first aerosol-forming substrate and the second aerosol-forming substrate of the aerosol-generating article. The second aerosol-forming substrate may be heated at a different time to the first aerosol-forming substrate. The second aerosol-forming substrate may be heated to a different temperature than the first aerosol-forming substrate. This may enable the aerosol-generating system to generate an aerosol having particularly desirable characteristics, and may enable the aerosol-generating system to generate aerosols having different characteristics.

As used herein, the term "aerosol-forming substrate" relates to a substrate capable of releasing volatile compounds that can form an aerosol. Such volatile compounds may be released by heating the aerosol-forming substrate. An aerosol-forming substrate is typically part of an aerosol-generating article.

As used herein, the term "aerosol-generating article" refers to an article comprising an aerosol-forming substrate that is capable of releasing volatile compounds that can form an aerosol. For example, an aerosol-generating article may be an article that generates an aerosol that is directly inhalable by the user drawing or puffing on a mouthpiece at a proximal or user-end of the system. An aerosol-generating article may be disposable. An article comprising an aerosol-forming substrate comprising tobacco may be referred to herein as a tobacco stick.

As used herein, the term "aerosol-generating device" refers to a device that interacts with an aerosol-forming substrate to generate an aerosol.

As used herein, the term "aerosol-generating system" refers to the combination of an aerosol-generating device with an aerosol-generating article. In the aerosol-generating system, the aerosol-generating article and the aerosol-generating device cooperate to generate a respirable aerosol.

As used herein, the term "varying current" includes any currents that vary with time to generate a varying magnetic field. The term "varying current" is intended to include alternating currents. Where the varying current is an alternating current, the alternating current generates an alternating magnetic field.

As used herein, the term "length" refers to the major dimension in a longitudinal direction of an aerosol-generating device or an aerosol-generating article, or a component of the aerosol-generating device or the aerosol-generating article.

As used herein, the term "width" refers to the major dimension in a transverse direction of an aerosol-generating device or an aerosol-generating article, or a component of the aerosol-generating device or the aerosol-generating article, at a particular location along its length. The term "thickness" refers to the dimension in a transverse direction perpendicular to the width.

As used herein, the term "transverse cross-section" is used to describe the cross-section of an aerosol-generating device or an aerosol-generating article, or a component of the aerosol-generating device or the aerosol-generating article, in a direction perpendicular to the longitudinal direction at a particular location along its length.

As used herein, the term "proximal" refers to a user end, or mouth end of the aerosol-generating device or aerosol-generating article. The proximal end of a component of an aerosol-generating device or an aerosol-generating article is the end of the component closest to the user end, or mouth end of the aerosol-generating device or the aerosol-generating article. As used herein, the term "distal" refers to the end opposite the proximal end.

According to the present disclosure, there is provided an inductive heating element for an aerosol-generating system.

The inductive heating element may be an external heating element. As used herein, the term "external heating element" refers to a heating element configured to heat an outer surface of an aerosol-forming substrate.

An external heating element is preferably configured to at least partially surround an aerosol forming substrate when the aerosol-forming substrate is received by an aerosol-generating device. The inductive heating element may be configured to heat an outer surface of the aerosol-forming substrate when the aerosol-forming substrate is received in the inductive heating element cavity.

The inductive heating element comprises a cavity for receiving aerosol-forming substrate. The inductive heating element may comprise an outer side and an inner side, opposite the outer side. The inner side may at least partially define the inductive heating element cavity for receiving aerosol-forming substrate. The first susceptor is a tubular susceptor defining a portion of an inductive heating element cavity. The second susceptor is a tubular susceptor defining a portion of an inductive heating element cavity.

In some embodiments, the inductive heating element comprises a plurality of inner cavities for receiving aerosol-forming substrate. The inner cavity of the first susceptor may form a first cavity of the inductive heating element, and the inner cavity of the second susceptor may form a second cavity of the inductive heating element.

In some preferred embodiments, the inductive heating element comprises a single inner cavity for receiving aerosol-forming substrate. In these embodiments, the inner cavity of the first susceptor defines a portion of the single inner cavity of the inductive heating element, and the inner cavity of the second susceptor defines a second portion of the single inner cavity of the inductive heating element. In some preferred embodiments, the inductive heating element is a tubular inductive heating element. An inner surface of the tubular inductive heating element may define the inductive heating element cavity.

In embodiments in which the aerosol-generating device comprises a device cavity for receiving an aerosol-forming substrate, the inductive heating element may at least partially circumscribe the device cavity. The inductive heating element cavity may be aligned with the device cavity.

The inductive heating element comprises a first susceptor and a second susceptor.

As used herein, the term "susceptor" refers to an element comprising a material that is capable of converting electromagnetic energy into heat. When a susceptor is located in a varying magnetic field, the susceptor is heated. Heating of the susceptor may be the result of at least one of hysteresis losses and eddy currents induced in the susceptor, depending on the electrical and magnetic properties of the susceptor material.

A susceptor may comprise any suitable material. A susceptor may be formed from any material that can be inductively heated to a temperature sufficient to aerosolise an aerosol-forming substrate. Preferred susceptors may be heated to a temperature in excess of about 250 degrees Celsius. Preferred susceptors may be formed from an electrically conductive material. As used herein, "electrically conductive" refers to materials having an electrical resistivity of less than or equal to $1\times10^{-4}$ ohm metres (Ω.m), at twenty degrees Celsius. Preferred susceptors may be formed from a thermally conductive material. As used herein, the term "thermally conductive material" is used to describe a material having a thermal conductivity of at least 10 watts per metre Kelvin (W/(m.K)) at 23 degrees Celsius and a relative humidity of 50 percent as measured using the modified transient plane source (MTPS) method.

Suitable materials for a susceptor include graphite, molybdenum, silicon carbide, stainless steels, niobium, aluminium, nickel, nickel containing compounds, titanium, and composites of metallic materials. Some preferred susceptors comprise a metal or carbon. Some preferred susceptors comprise a ferromagnetic material, for example, ferritic iron, a ferromagnetic alloy, such as ferromagnetic steel or stainless steel, ferromagnetic particles, and ferrite. Some preferred susceptors consists of a ferromagnetic material. A suitable susceptor may comprise aluminium. A suitable susceptor may consist of aluminium. A susceptor may comprise at least about 5 percent, at least about 20 percent, at least about 50 percent or at least about 90 percent of ferromagnetic or paramagnetic materials.

Preferably, a susceptor is formed from a material that is substantially impermeable to gas. In other words, preferably, a susceptor is formed from a material that is not gas permeable.

The first susceptor is a tubular susceptor. The second susceptor is a tubular susceptor. A tubular susceptor comprises an annular body defining an inner cavity. The susceptor cavity is configured to receive aerosol-forming substrate. The susceptor cavity may be an open cavity. The susceptor cavity may be open at one end. The susceptor cavity may be open at both ends.

Where a susceptor is a tubular susceptor having a cavity for receiving aerosol-forming substrate that is open at one end or both ends, preferably the susceptor is substantially impermeable to gas from the outer surface to the inner surface defining the inner cavity. In other words, preferably the susceptor is substantially impermeable to gas through the sidewalls of the susceptor.

A susceptor of the inductive heating element may have any suitable form. For example, a susceptor may be elongate. A susceptor may have any suitable transverse cross-section. For example, a susceptor may have a circular, elliptical, square, rectangular, triangular or other polygonal transverse cross-section.

In some embodiments, each susceptor is substantially identical. For example, the second susceptor may be substantially identical to the first susceptor. Each susceptor may be formed from the same material. Each susceptor may have substantially the same shape and dimensions. Making each susceptor substantially identical to the other susceptors may enable each susceptor to be heated to substantially the same temperature, and heated at substantially the same rate, when exposed to a given varying magnetic field.

In some embodiments, the second susceptor differs to the first susceptor in at least one characteristic. The second susceptor may be formed from a different material than the first susceptor. The second susceptor may have a different shape and dimensions to the first susceptor. The second susceptor may have a length that is longer than the length of the first susceptor. Making each susceptor different to the other susceptors may enable each susceptor to be adapted to provide optimal heat for different aerosol-forming substrates.

In one example, a first aerosol-forming substrate may require heating to a first temperature in order to generate a first aerosol with desired characteristics, and a second aerosol-forming substrate may require heating to a second temperature, different to the first temperature, in order to generate a second aerosol with desired characteristics. In this example, the first susceptor may be formed from a first material suitable for heating the first aerosol-forming substrate to the first temperature, and the second susceptor may be formed from a second material, different to the first material, suitable for heating the second aerosol-forming substrate to the second temperature.

In another example, an aerosol-generating article may comprise a first aerosol-forming substrate having a first length, and a second aerosol-forming substrate having a second length, different to the first length, such that heating the second aerosol-forming substrate generates a different amount of aerosol than heating the first aerosol-forming substrate. In this embodiment, the first susceptor may have a length substantially equal to the first length, and the second susceptor may have a length substantially equal to the second length.

In some preferred embodiments, the first susceptor is an elongate tubular susceptor and the second susceptor is an elongate tubular susceptor. In these preferred embodiments, the first susceptor and the second susceptor may be substantially aligned. In other words, the first susceptor and the second susceptor may be coaxially aligned.

The inductive heating element may comprise any suitable number of susceptors. The inductive heating element comprises a plurality of susceptors. The inductive heating element comprises at least two susceptors. For example, the inductive heating element may comprise three, four, five or six susceptors. Where the inductive heating element comprises more than two susceptors, an intermediate element may be disposed between each adjacent pair of susceptors.

In some preferred embodiments, a susceptor may comprise a susceptor layer provided on a support body. Each of the first susceptor and the second susceptor may be formed from a support body and a susceptor layer. Arranging a susceptor in a varying magnetic field induces eddy currents in close proximity to the susceptor surface, in an effect that is referred to as the skin effect. Accordingly, it is possible to form a susceptor from a relatively thin layer of susceptor material, while ensuring the susceptor is effectively heated in the presence of a varying magnetic field. Making a susceptor from a support body and a relatively thin susceptor layer may facilitate manufacture of an aerosol-generating article that is simple, inexpensive and robust.

The support body may be formed from a material that is not susceptible to inductive heating. Advantageously, this may reduce heating of surfaces of the susceptor that are not in contact with an aerosol-forming substrate, where surfaces of the support body form surfaces of the susceptor that are not in contact with an aerosol-forming substrate.

The support body may comprise an electrically insulative material. As used herein, "electrically insulating" refers to materials having an electrical resistivity of at least $1\times10^4$ ohm metres (Ω.m), at twenty degrees Celsius.

The support body may comprise a thermally insulative material for thermally insulating the first susceptor from the second susceptor. As used herein the term 'thermally insulative material' is used to describe material having a bulk thermal conductivity of less than or equal to about 40 watts per metre Kelvin (W/(m.K)) at 23 degrees Celsius and a relative humidity of 50 percent as measured using the modified transient plane source (MTPS) method.

Forming the support body from a thermally insulative material may provide a thermally insulative barrier between the susceptor layer and other components of an inductive heating arrangement, such as an inductor coil circumscribing the inductive heating element. Advantageously, this may reduce heat transfer between the susceptor and other components of an inductive heating system.

The support body may be a tubular support body and the susceptor layer may be provided on an inner surface of the tubular support body. Providing the susceptor layer on the inner surface of the support body may position the susceptor layer adjacent an aerosol-forming substrate in the cavity of the inductive heating element, improving heat transfer between the susceptor layer and the aerosol-forming substrate.

In some preferred embodiments, the first susceptor comprises a tubular support body formed from a thermally insulative material and a susceptor layer on an inner surface of the tubular support body. In some preferred embodiments, the second susceptor comprises a tubular support body formed from a thermally insulative material and a susceptor layer on an inner surface of the tubular support body.

The susceptor may be provided with a protective outer layer, for example a protective ceramic layer or protective glass layer. A protective outer layer may improve the durability of the susceptor and facilitate cleaning of the susceptor. The protective outer layer may substantially surround the susceptor. The susceptor may comprise a protective coating formed from a glass, a ceramic, or an inert metal.

The inductive heating element comprises a separation between the first susceptor and the second susceptor.

The separation may be any suitable size to thermally insulate the first susceptor from the second susceptor.

The inductive heating element may comprise an intermediate element disposed between the first susceptor and the second susceptor. The intermediate element may be disposed in the separation between the first susceptor and the second susceptor. The intermediate element may extend between the first susceptor and the second susceptor. The intermediate element may contact an end of the first susceptor. The intermediate element may contact an end of the second susceptor. The intermediate element may be secured to an end of the first susceptor. The intermediate element may be secured to an end of the second susceptor. The intermediate element may connect the second susceptor to the first susceptor. Where the intermediate element connects the second susceptor to the first susceptor, the intermediate element may provide the inductive heating element with structural support. Advantageously, the intermediate element may enable the inductive heating element to be provided as a single unitary element that may be straightforward to remove and replace from an inductive heating arrangement.

The intermediate element may have any suitable form. The intermediate element may have any suitable transverse cross-section. For example, the intermediate element may have a circular, elliptical, square, rectangular, triangular or other polygonal transverse cross-section. The intermediate element may be tubular. A tubular intermediate element comprises an annular body defining an inner cavity. The intermediate element may be configured to enable gas to permeate from an outer side of the intermediate element into the inner cavity. The intermediate element cavity may be configured to receive a portion of an aerosol-generating article. The intermediate element cavity may be an open cavity. The intermediate element cavity may be open at one end. The intermediate element cavity may be open at both ends.

In some preferred embodiments, the first susceptor and the second susceptor are tubular susceptors, and the intermediate element is a tubular intermediate element. In these embodiments, the tubular first susceptor, the tubular second susceptor and the tubular intermediate element may be substantially aligned. The tubular first susceptor, the tubular intermediate element and the tubular second susceptor may be arranged end-to-end, in the form of a tubular rod. The inner cavities of the tubular first susceptor, the tubular intermediate element and the tubular second susceptor may be substantially aligned. The inner cavities of the tubular first susceptor, the tubular intermediate element and the tubular second susceptor may define the inductive heating element cavity.

The intermediate element may be formed from any suitable material.

In preferred embodiments, the intermediate element is formed from a different material to the first susceptor and the second susceptor.

The intermediate element may comprise a thermally insulative material for thermally insulating the first susceptor from the second susceptor. The intermediate element may comprise a material having a bulk thermal conductivity of less than or equal to about 100 milliwatts per metre Kelvin (mW/(mK)) at 23 degrees Celsius and a relative humidity of 50 percent as measured using the modified transient plane source (MTPS) method. Providing an intermediate element formed from a thermally insulative material in the separation between the first susceptor and the second susceptor may further reduce heat transfer between the first susceptor and the second susceptor. Advantageously, this may improve the ability of an inductive heating element to selectively heat discrete portions of an aerosol-forming substrate. This may also enable the size of the separation between the first susceptor and the second susceptor to be reduced, and, in turn, the size of the inductive heating element to be reduced.

The intermediate element may comprise an electrically insulative material for electrically insulating the first susceptor from the second susceptor. The susceptor may comprise a material having an electrical resistivity of at least $1\times10^4$ ohm metres (Ωm), at twenty degrees Celsius.

The intermediate element may comprise at least one of: a thermally insulative material for thermally insulating the first susceptor from the second susceptor; and an electrically insulative material for electrically insulating the first susceptor from the second susceptor. In some preferred embodiments, the intermediate element comprises a thermally insulative material for thermally insulating the first susceptor from the second susceptor, and an electrically insulative material for electrically insulating the first susceptor from the second susceptor.

Particularly suitable materials for the intermediate element may include polymeric materials, such as polyetheretherketone (PEEK), liquid crystal polymers, such as Kevlar®, certain cements, glasses, and ceramic materials, such as zirconium dioxide (ZrO2), silicon nitride (Si3N4) and aluminium oxide (Al2O3).

The intermediate element may be gas permeable. In other words, the intermediate element is configured to enable gas to permeate through the intermediate element. Typically, the intermediate element is configured to enable gas to permeate from one side of the intermediate element to another side of the intermediate element. The intermediate element may comprise an outer side and an inner side, opposite the outer side. The intermediate element may be configured to enable gas to permeate from the outer side to the inner side.

In some embodiments, the intermediate element comprise an air passage configured to permit the passage of air through the intermediate element. In these embodiments, the intermediate element may not be required to be formed from a gas permeable material. Accordingly, in some embodiments, the intermediate element is formed from a material that is not permeable to gas, and comprises an air passage configured to permit the passage of air through the intermediate element. The intermediate element may comprise a plurality of air passages. The intermediate element may comprise any suitable number of air passages, for example, two, three, four, five or six air passages. Where the intermediate element comprises a plurality of air passages, the air passages may be regularly spaced apart on the intermediate element.

Where the intermediate element is a tubular intermediate element defining an inner cavity, the intermediate element may comprise an air passage configured to permit air to flow from an outer surface of the intermediate element into the inner cavity. The intermediate element may comprise an air passage extending from an outer surface to an inner surface. Where a tubular intermediate element comprises a plurality of air passages, the air passages may be regularly spaced around the circumference of the tubular intermediate element.

The inductive heating element may be comprised in an inductive heating arrangement.

An inductive heating arrangement further comprises an inductor coil. Preferably, the inductive heating arrangement comprises a first inductor coil and a second inductor coil.

The first inductor coil is configured such that a varying electric current supplied to the first inductor coil generates a varying magnetic field. The first inductor coil is arranged relative to the inductive heating element such that a varying electric current supplied to the first inductor coil generates a varying magnetic field that heats the first susceptor of the inductive heating element.

The second inductor coil is configured such that a varying electric current supplied to the second inductor coil generates a varying magnetic field. The second inductor coil is arranged relative to the inductive heating element such that a varying electric current supplied to the second inductor coil generates a varying magnetic field that heats the second susceptor of the inductive heating element.

An inductor coil may have any suitable form. For example, an inductor coil may be a flat inductor coil. A flat inductor coil may be wound in a spiral, substantially in a plane. Preferably, the inductor coil is a tubular inductor coil, defining an inner cavity. Typically, a tubular inductor coil is helically wound about an axis. An inductor coil may be elongate. Particularly preferably, an inductor coil may be an elongate tubular inductor coil. An inductor coil may have any suitable transverse cross-section. For example, an inductor coil may have a circular, elliptical, square, rectangular, triangular or other polygonal transverse cross-section.

An inductor coil may be formed from any suitable material. An inductor coil is formed from an electrically conductive material. Preferably, the inductor coil is formed from a metal or a metal alloy.

Where an inductor coil is a tubular inductor coil, preferably, a portion of the inductive heating element is arranged within the inner cavity of the inductor coil. Particularly preferably, the first inductor coil is a tubular inductor coil, and at least a portion of the first susceptor is arranged within the inner cavity of the first inductor coil. The length of the tubular first inductor coil may be substantially similar to the length of the first susceptor. Particularly preferably, the second inductor coil is a tubular inductor coil, and at least a portion of the second susceptor is arranged within the inner cavity of the second inductor coil. The length of the tubular second inductor coil may be substantially similar to the length of the second susceptor.

In some embodiments, the second inductor coil is substantially identical to the first inductor coil. In other words, the first inductor coil and the second inductor coil have the same shape, dimensions and number of turns. Particularly preferably, the second inductor coil is substantially identical to the first inductor coil in embodiments in which the second susceptor is substantially identical to the first susceptor.

In some embodiments, the second inductor coil is different to the first inductor coil. For example, the second inductor coil may have a different length, number of turns or transverse cross-section to the first inductor coil. Particularly preferably, the second inductor coil is different to the first inductor coil in embodiments in which the second susceptor is different to the first susceptor.

The first inductor coil and the second inductor coil may be arranged in any suitable arrangement. Particularly preferably, the first inductor coil and the second inductor coil are coaxially aligned along an axis. Where the first inductor coil and the second inductor coil are elongate tubular inductor coils, the first inductor coil and the second inductor coil may be coaxially aligned along a longitudinal axis, such that the inner cavities of the coils are aligned along the longitudinal axis.

The inductive heating arrangement may comprise any suitable number of inductor coils. The inductive heating element comprises a plurality of inductor coils. The inductive heating arrangement comprises at least two inductor coils. Preferably, the number of inductor coils of the inductive heating arrangement is the same as the number of susceptors of the inductive heating element. The number of inductor coils of the inductive heating arrangement may be different to the number of susceptors of the inductive heating element. Where the number of inductor coils is the same as the number of susceptors, preferably each inductor coil is disposed about a susceptor. Particularly preferably, each inductor coil extends substantially the length of the susceptor about which it is disposed.

The inductive heating element may comprise a flux concentrator. The flux concentrator may be disposed around an inductor coil of the inductive heating arrangement. The flux concentrator is configured to distort the varying magnetic field generated by the inductor coil towards the inductive heating element.

Advantageously, by distorting the magnetic field towards the inductive heating element, a flux concentrator can concentrate the magnetic field at the inductive heating element. This may increase the efficiency of the inductive heating arrangement in comparison to embodiments in which a flux concentrator is not provided. As used herein, the phrase "concentrate the magnetic field" means to distort the magnetic field so that the magnetic energy density of the magnetic field is increased where the magnetic field is "concentrated".

As used herein, the term "flux concentrator" refers to a component having a high relative magnetic permeability which acts to concentrate and guide the magnetic field or magnetic field lines generated by an inductor coil. As used herein, the term "relative magnetic permeability" refers to the ratio of the magnetic permeability of a material, or of a medium, such as the flux concentrator, to the magnetic permeability of free space, "$\mu_0$", where $\mu_0$ is $4\pi\times10^{-7}$ newtons per ampere squared ($N.A^{-2}$).

As used herein, the term "high relative magnetic permeability" refers to a relative magnetic permeability of at least 5 at 25 degrees Celsius, for example at least 10, at least 20, at least 30, at least 40, at least 50, at least 60, at least 80, or at least 100 degrees Celsius. These example values preferably refer to the values of relative magnetic permeability for a frequency of between 6 and 8 megahertz (MHz) and a temperature of 25 degrees Celsius.

The flux concentrator may be formed from any suitable material or combination of materials. Preferably, the flux concentrator comprises a ferromagnetic material, for example a ferrite material, a ferrite powder held in a binder, or any other suitable material including ferrite material such as ferritic iron, ferromagnetic steel or stainless steel.

In some embodiments, the inductive heating arrangement comprises a flux concentrator disposed around the first inductor coil and the second inductor coil. In these embodiments, the flux concentrator is configured to distort the varying magnetic field generated by the first inductor coil towards the first susceptor of the inductive heating element and to distort the varying magnetic field generated by the second inductor coil towards the second susceptor of the inductive heating element.

In some of these embodiments, a portion of the flux concentrator extends into the intermediate element between the first susceptor and the second susceptor. Extending a portion of a flux concentrator into the intermediate element between the first susceptor and the second susceptor may further distort the magnetic field generated by the first inductor coil and the magnetic field generated by the second inductor coil. This further distortion may result in the magnetic field generated by the first inductor coil being further concentrated towards the first susceptor, and the magnetic field generated by the second inductor coil being further concentrated towards the second susceptor. This may further improve the efficiency of the inductive heating arrangement.

In some embodiments, the inductive heating arrangement comprises a plurality of flux concentrators. In some preferred embodiments, an individual flux concentrator is disposed around each inductor coil. Providing each inductor coil with a dedicated flux concentrator may enable the flux concentrator to be configured optimally to distort the magnetic field generated by the inductor coil. Such an arrangement may also enable the inductive heating arrangement to be formed from modular inductive heating units. Each inductive heating unit may comprise an inductor coil and a flux concentrator. Providing modular inductive heating units may facilitate standardised manufacturing of the inductive heating arrangement, and enable individual units to be removed and replaced.

In some preferred embodiments, the inductive heating arrangement comprises: a first flux concentrator disposed around the first inductor coil, the first flux concentrator being configured to distort the varying magnetic field generated by the first inductor coil towards the first susceptor; and a second flux concentrator disposed around the second inductor coil, the second flux concentrator being configured to distort the varying magnetic field generated by the second inductor coil towards the second susceptor.

In these preferred embodiments, a portion of the first flux concentrator may extend into the intermediate element between the first susceptor and the second susceptor. In these preferred embodiments, a portion of the second flux concentrator may extend into the intermediate element between the first susceptor and the second susceptor. Extending a portion of a flux concentrator into the intermediate element between susceptors may enable the flux concentrator to further distort the magnetic field generated by the inductor coil towards the susceptor.

The inductive heating arrangement may further comprise an inductive heating arrangement housing. The housing may keep together the inductive heating element, inductor coils and flux concentrators. This may help to secure the relative arrangements of the components of the inductive heating arrangement, and improve the coupling between the components. Preferably, the inductive heating arrangement housing is formed from an electrically insulative material.

Where the inductive heating arrangement comprises individual inductive heating units including an inductor coil and a flux concentrator, each inductive heating unit may comprise an inductive heating unit housing. The inductive heating unit housing may keep together the components of the inductive heating unit, and improve the coupling between the components. Preferably, the inductive heating unit housing is formed from an electrically insulative material.

The inductive heating arrangement may be comprised in an aerosol-generating device.

The aerosol-generating device may comprise a power supply. The power supply may be any suitable type of power supply. The power supply may be a DC power supply. In some preferred embodiments, the power supply is a battery, such as a rechargeable lithium ion battery. The power supply may be another form of charge storage device, such as a capacitor. The power supply may require recharging. The power supply may have a capacity that allows for the storage of enough energy for one or more uses of the device. For example, the power supply may have sufficient capacity to allow for the continuous generation of aerosol for a period of around six minutes, corresponding to the typical time taken to smoke a conventional cigarette, or for a period that is a multiple of six minutes. In another example, the power supply may have sufficient capacity to allow for a predetermined number of uses of the device or discrete activations. In one embodiment, the power supply is a DC power supply having a DC supply voltage in the range of about 2.5 Volts to about 4.5 Volts and a DC supply current in the range of about 1 Amp to about 10 Amps (corresponding to a DC power supply in the range of about 2.5 Watts to about 45 Watts).

The aerosol-generating device may comprise a controller connected to the inductive heating arrangement and the power supply. In particular, the aerosol-generating device may comprise a controller connected to the first inductor coil and the second inductor coil and the power supply. The controller is configured to control the supply of power to the inductive heating arrangement from the power supply. The controller may comprise a microprocessor, which may be a programmable microprocessor, a microcontroller, or an application specific integrated chip (ASIC) or other electronic circuitry capable of providing control. The controller may comprise further electronic components. The controller may be configured to regulate a supply of current to the inductive heating arrangement. Current may be supplied to the inductive heating arrangement continuously following activation of the aerosol-generating device or may be supplied intermittently, such as on a puff by puff basis.

The controller may advantageously comprise DC/AC inverter, which may comprise a Class-C, Class-D or Class-E power amplifier.

The controller may be configured to supply a varying current to the inductive heating arrangement having any suitable frequency. The controller may be configured to supply a varying current to the inductive heating arrangement having a frequency of between about 5 kilohertz and about 30 megahertz. In some preferred embodiments, the controller is configured to supply a varying current to the inductive heating arrangement of between about 5 kilohertz and about 500 kilohertz. In some embodiments, the controller is configured to supply a high frequency varying current to the inductive heating arrangement. As used herein, the term "high frequency varying current" means a varying current having a frequency of between about 500 kilohertz and about 30 megahertz. The high frequency varying current may have a frequency of between about 1 megahertz and about 30 megahertz, such as between about 1 megahertz and about 10 megahertz, or such as between about 5 megahertz and about 8 megahertz.

The aerosol-generating device may comprise a device housing. The device housing may be elongate. The device housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. Preferably, the material is light and non-brittle.

The device housing may define a device cavity for receiving an aerosol-forming substrate. The device cavity may be configured to receive at least a portion of an aerosol-generating article. The device cavity may have any suitable shape and size. The device cavity may be substantially cylindrical. The device cavity may have a substantially circular transverse cross-section.

The inductive heating element may be disposed in the device cavity. The inductive heating element may be disposed about the device cavity. Where the inductive heating element is a tubular inductive heating element, the inductive heating element may circumscribe the device cavity. An inner surface of the inductive heating element may form an inner surface of the device cavity.

The first inductor coil and the second inductor coil may be disposed in the device cavity. The first inductor coil and the second inductor coil may be disposed about the device cavity. The first inductor coil and the second inductor coil may circumscribe the device cavity. An inner surface of the first inductor coil and the second inductor coil may form an inner surface of the device cavity.

The device may have a proximal end and a distal end, opposite the proximal end. Preferably, the device cavity is arranged at a proximal end of the device.

The device housing may comprises an air inlet. The air inlet may be configured to enable ambient air to enter the device housing. The device housing may comprise any suitable number of air inlets. The device housing may comprise a plurality of air inlets.

The device housing may comprise an air outlet. The air outlet may be configured to enable air to enter the device cavity from within the device housing. The device housing may comprise any suitable number of air outlets. The device housing may comprise a plurality of air outlets.

Where the intermediate element of the inductive heating element is gas permeable, the aerosol-generating device may define an airflow pathway extending from the air inlet to the intermediate element of the inductive heating element. Such an airflow pathway may enable air to be drawn through the aerosol-generating device from the air inlet and into the device cavity through the intermediate element.

In some embodiments, the device cavity comprises a proximal end and a distal end, opposite the proximal end. In these embodiments, the device cavity may be open at the proximal end for receiving an aerosol-generating article. In these embodiment, the device cavity may be substantially closed at the distal end. The device housing may comprise an air outlet at the distal end of the device cavity. The aerosol-generating device may further comprise an annular seal towards the proximal end of the device cavity. The annular seal may extend into the device cavity. The annular seal may provide a substantially air-tight seal between the device housing and an external surface of an aerosol-generating article received in the device cavity. This may reduce the volume of air drawn into the device cavity in use through any gaps that exists between the external surface of the aerosol-generating article and the inner surface of the device cavity. This may increase the volume of air drawn into the aerosol-generating article through the permeable intermediate elements.

In some embodiments, the device housing comprises a mouthpiece. The mouthpiece may comprise at least one air inlet and at least one air outlet. The mouthpiece may comprise more than one air inlet. One or more of the air inlets may reduce the temperature of the aerosol before it is delivered to a user and may reduce the concentration of the aerosol before it is delivered to a user.

In some embodiments, a mouthpiece is provided as part of an aerosol-generating article. As used herein, the term "mouthpiece" refers to a portion of an aerosol-generating system that is placed into a user's mouth in order to directly inhale an aerosol generated by the aerosol-generating system from an aerosol-generating article received by the aerosol-generating device.

The aerosol-generating device may comprise a temperature sensor. The temperature sensor may be arranged to sense the temperature of the inductive heating element. The aerosol-generating device may comprise a first temperature sensor arranged to sense the temperature of the first susceptor. The aerosol-generating device may comprise a second temperature sensor arranged to sense the temperature of the second susceptor.

The aerosol-generating device may include a user interface to activate the device, for example a button to initiate heating of an aerosol-generating article.

The aerosol-generating device may comprise a display to indicate a state of the device or of the aerosol-forming substrate.

The aerosol-generating device may comprise a puff sensor, for sensing a user drawing on the aerosol-generating system.

Preferably, the aerosol-generating device is portable. The aerosol-generating device may have a size comparable to a conventional cigar or cigarette. The aerosol-generating device may have a total length between about 30 millimetres and about 150 millimetres. The aerosol-generating device may have an outer diameter between about 5 millimetres and about 30 millimetres.

The aerosol-generating device may form part of an aerosol-generating system.

The aerosol-generating system may further comprise an aerosol-generating article. The aerosol-generating article may comprise a first aerosol-forming substrate; and a second aerosol-forming substrate. When the aerosol-generating article is received in the device cavity, at least a portion of the first aerosol-forming substrate may be received in the first portion of the device cavity, and at least a portion of the second aerosol-forming substrate may be received in the second portion of the device cavity.

The inductive heating element, forming part of the inductive heating arrangement of the aerosol-generating device, is configured to heat an aerosol-forming substrate.

The aerosol-forming substrate may comprise nicotine. The nicotine-containing aerosol-forming substrate may be a nicotine salt matrix.

The aerosol-forming substrate may be a liquid. The aerosol-forming substrate may comprise solid components and liquid components. Preferably, the aerosol-forming substrate is a solid.

The aerosol-forming substrate may comprise plant-based material. The aerosol-forming substrate may comprise tobacco. The aerosol-forming substrate may comprise a tobacco-containing material including volatile tobacco flavour compounds which are released from the aerosol-forming substrate upon heating. The aerosol-forming substrate may comprise a non-tobacco material. The aerosol-forming substrate may comprise homogenised plant-based material. The aerosol-forming substrate may comprise homogenised tobacco material. Homogenised tobacco material may be formed by agglomerating particulate tobacco. In a particularly preferred embodiment, the aerosol-forming substrate comprises a gathered crimped sheet of homogenised tobacco material. As used herein, the term 'crimped sheet' denotes a sheet having a plurality of substantially parallel ridges or corrugations.

The aerosol-forming substrate may comprise at least one aerosol-former. An aerosol-former is any suitable known compound or mixture of compounds that, in use, facilitates formation of a dense and stable aerosol and that is substantially resistant to thermal degradation at the temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Preferred aerosol formers may include polyhydric alcohols or mixtures thereof, such as triethylene glycol, 1,3-butanediol. Preferably, the aerosol former is glycerine. Where present, the homogenised tobacco material may have an aerosol-former content of equal to or greater than 5 percent by weight on a dry weight basis, such as between about 5 percent and about 30 percent by weight on a dry weight basis. The aerosol-forming substrate may comprise other additives and ingredients, such as flavourants.

The aerosol-forming substrate may be comprised in an aerosol-generating article. An aerosol-generating device comprising the inductive heating arrangement may be configured to receive at least a portion of an aerosol-generating article. The aerosol-generating article may have any suitable form. The aerosol-generating article may be substantially cylindrical in shape. The aerosol-generating article may be substantially elongate. The aerosol-generating article may have a length and a circumference substantially perpendicular to the length.

The aerosol-forming substrate may be provided as an aerosol-generating segment containing an aerosol-forming substrate. The aerosol-generating segment may comprise a plurality of aerosol-forming substrates. The aerosol-generating segment may comprise a first aerosol-forming substrate and a second aerosol-forming substrate. In some embodiments, the second aerosol-forming substrate is substantially identical to the first aerosol-forming substrate. In some embodiments, the second aerosol-forming substrate is different from the first aerosol-forming substrate.

Where the aerosol-generating segment comprises a plurality of aerosol-forming substrates, the number of aerosol-forming substrates may be the same as the number of susceptors in the inductive heating element. Similarly, the number of aerosol-forming substrates may be the same as the number of inductor coils in the inductive heating arrangement.

The aerosol-generating segment may be substantially cylindrical in shape. The aerosol-generating segment may be substantially elongate. The aerosol-generating segment may also have a length and a circumference substantially perpendicular to the length.

Where the aerosol-generating segment comprises a plurality of aerosol-forming substrates, the aerosol-forming substrates may be arranged end-to-end along an axis of the aerosol-generating segment. In some embodiments, the aerosol-generating segment may comprise a separation between adjacent aerosol-forming substrates.

In some preferred embodiments, the aerosol-generating article may have a total length between about 30 millimetres and about 100 millimetres. In some embodiments, the aerosol-generating article has a total length of about 45 millimetres. The aerosol-generating article may have an outer diameter between about 5 millimetres and about 12 millimetres. In some embodiments, the aerosol-generating article may have an outer diameter of about 7.2 millimetres.

The aerosol-generating segment may have a length of between about 7 millimetres and about 15 millimetres. In some embodiments, the aerosol-generating segment may have a length of about 10 millimetres, or 12 millimetres.

The aerosol-generating segment preferably has an outer diameter that is about equal to the outer diameter of the aerosol-generating article. The outer diameter of the aerosol-generating segment may be between about 5 millimetres and about 12 millimetres. In one embodiment, the aerosol-generating segment may have an outer diameter of about 7.2 millimetres.

The aerosol-generating article may comprise a filter plug. The filter plug may be located at a proximal end of the aerosol-generating article. The filter plug may be a cellulose acetate filter plug. In some embodiments, the filter plug may have a length of about 5 millimetres to about 10 millimetres. In some preferred embodiments, the filter plug may have a length of about 7 millimetres.

The aerosol-generating article may comprise an outer wrapper. The outer wrapper may be formed from paper. The outer wrapper may be gas permeable at the aerosol-generating segment. In particular, in embodiments comprising a plurality of aerosol-forming substrate, the outer wrapper may comprise perforations or other air inlets at the interface between adjacent aerosol-forming substrates. Where a separation is provided between adjacent aerosol-forming substrates, the outer wrapper may comprise perforations or other air inlets at the separation. This may enable an aerosol-forming substrate to be directly provided with air that has not been drawn through another aerosol-forming substrate. This may increase the amount of air received by each aerosol-forming substrate. This may improve the characteristics of the aerosol generated from the aerosol-forming substrate.

The aerosol-generating article may also comprise a separation between the aerosol-forming substrate and the filter plug. The separation may be about 18 millimetres, but may be in the range of about 5 millimetres to about 25 millimetres.

It should also be appreciated that particular combinations of the various features described above may be implemented, supplied, and used independently.

Embodiments of the present disclosure will now be described, by way of example only, with reference to the accompanying drawings, in which.

Figure 5:
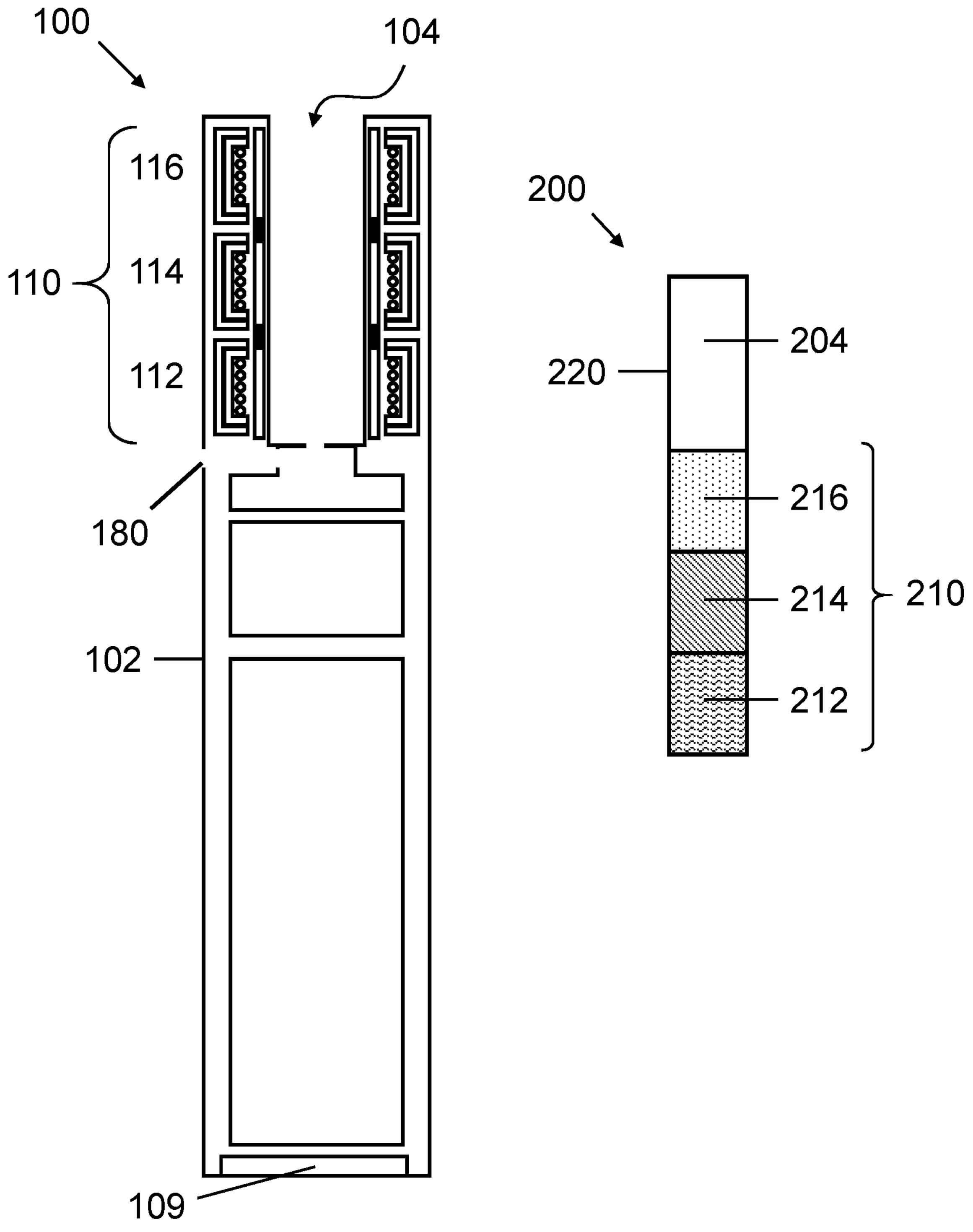
FIG. 5 shows a cross-sectional view of an aerosol-generating system according to an embodiment of the present invention, the aerosol-generating system comprising an aerosol-generating article, and an aerosol-generating device having an inductive heating arrangement.
Figure 6:
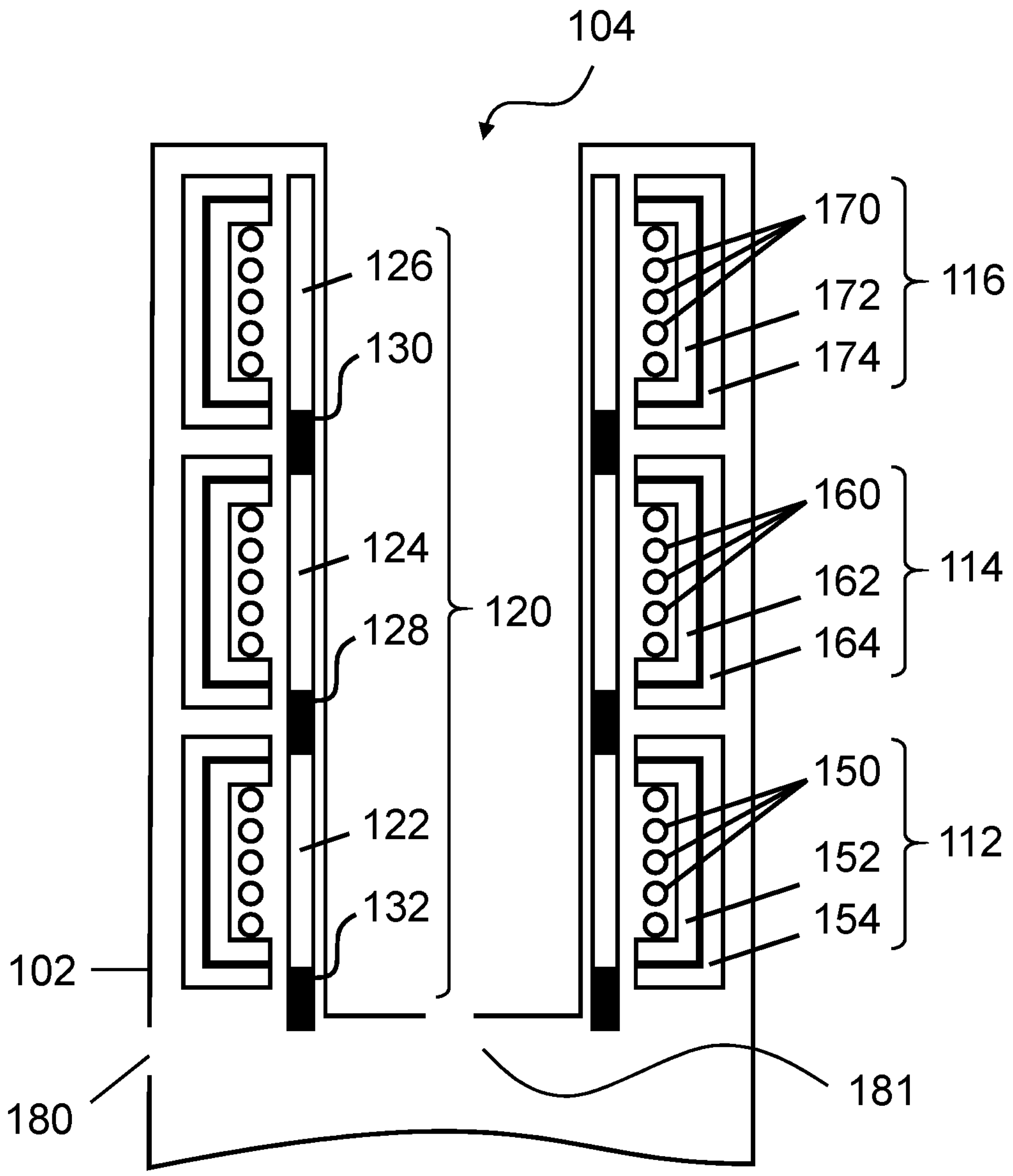
Figure 7:
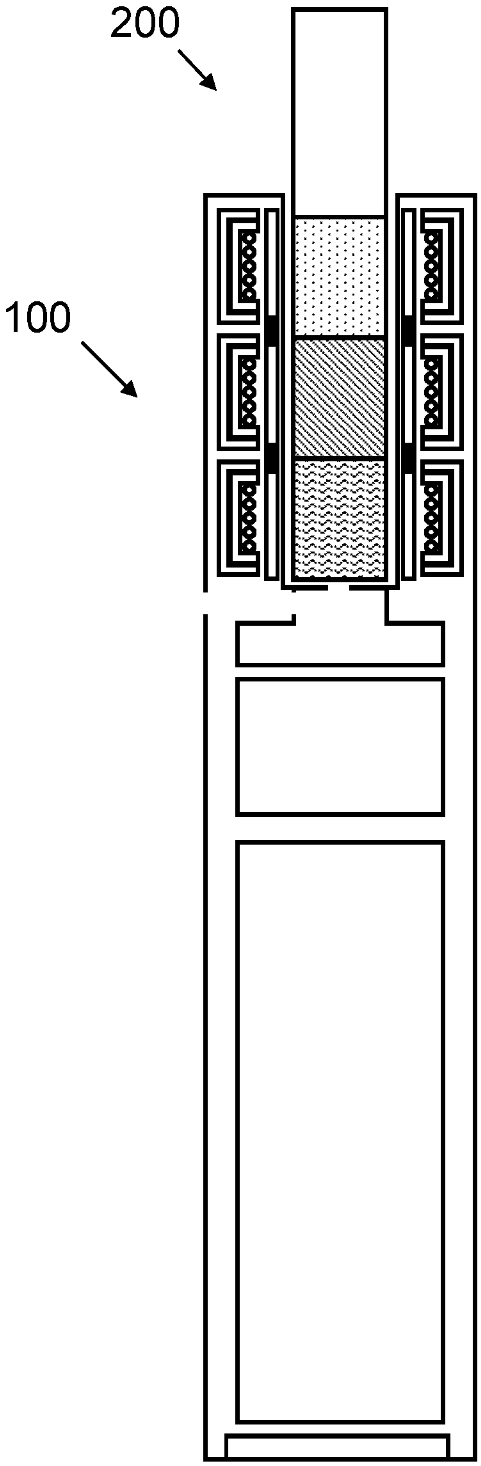
Figure 8:
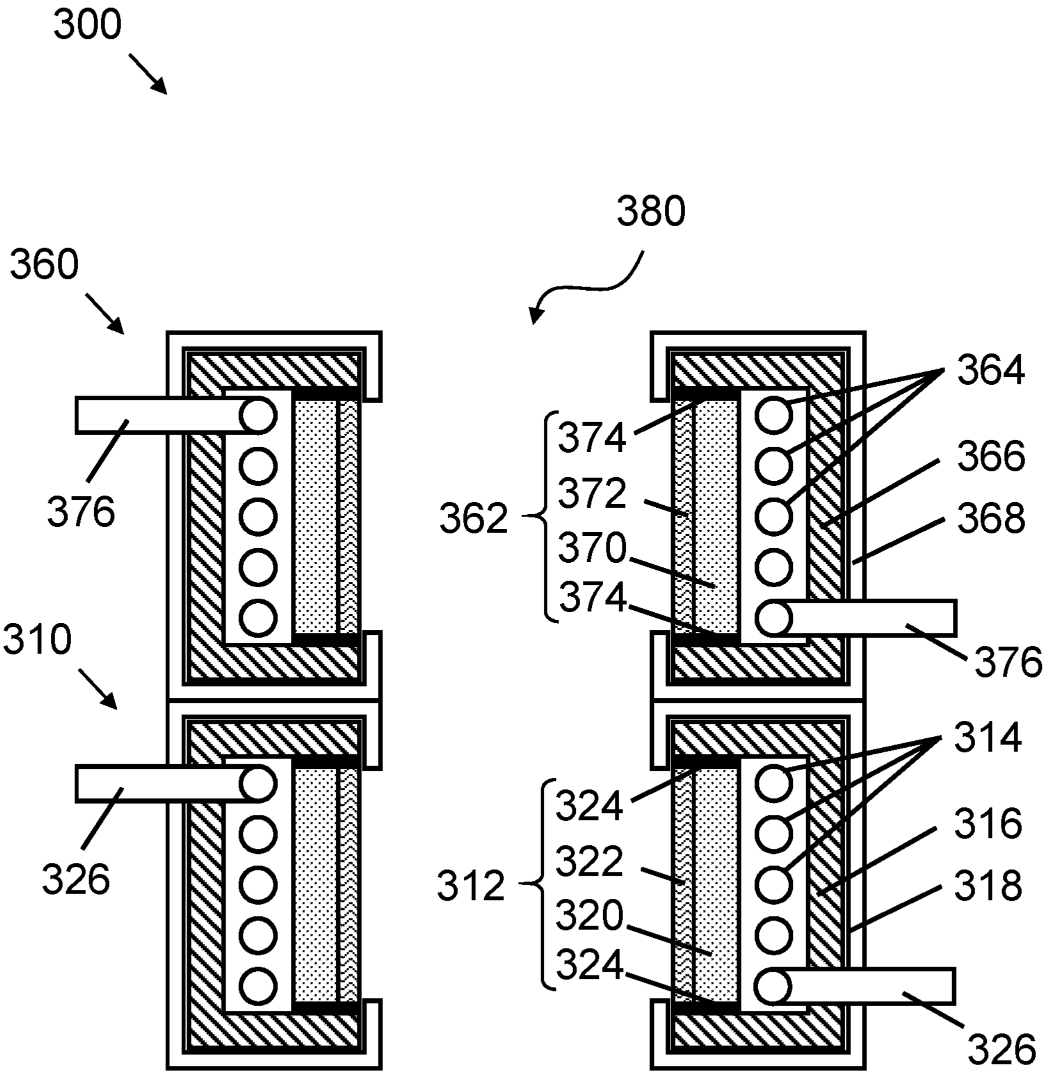

FIG. 6 a cross-sectional view of the proximal end of the aerosol-generating device of FIG. 5;

FIG. 7 shows a cross-sectional view of the aerosol-generating system of FIG. 5, with the aerosol-generating article received in the aerosol-generating device; and FIG. 8 shows a cross-sectional view of a modular inductive heating arrangement according to an embodiment of the present disclosure, the inductive heating arrangement comprising two stacked inductive heating units, each inductive heating unit comprising a susceptor having thermally insulative and electrically insulative intermediate elements arranged at both ends, an inductor coil, a flux concentrator and a housing.

Figure 1:
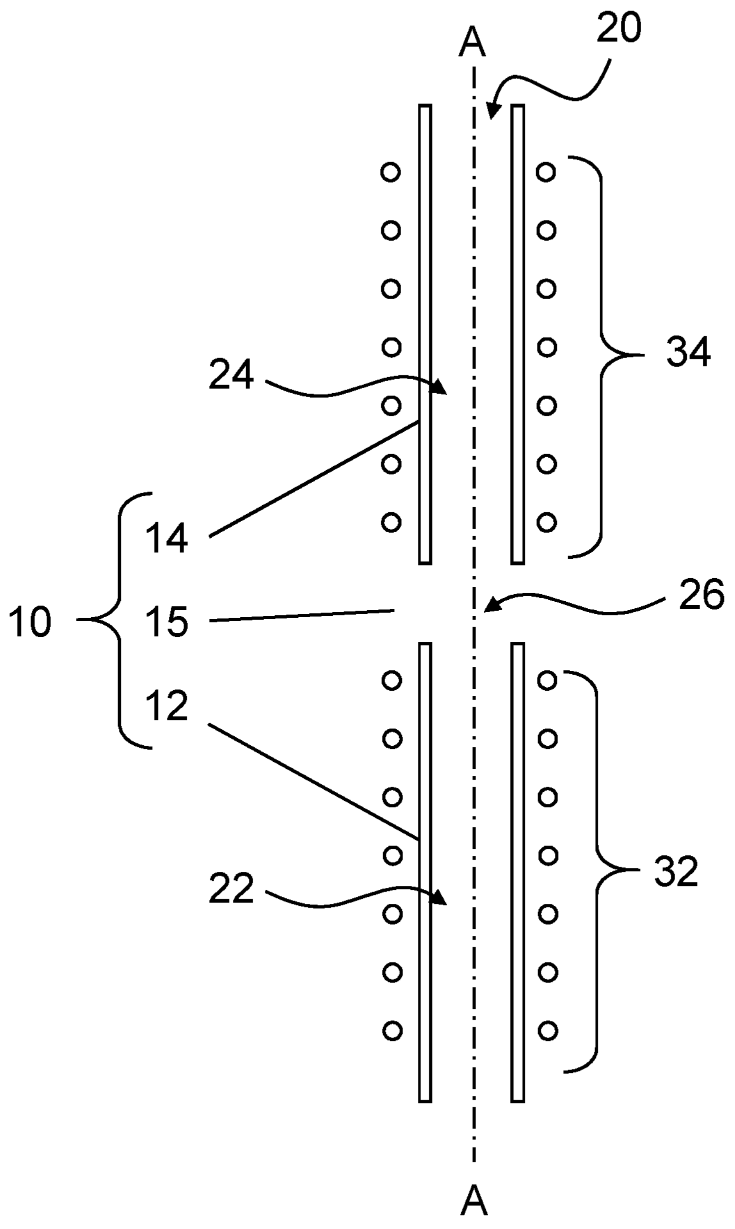
FIG. 1 shows a schematic illustration of an inductive heating element according to an embodiment of this disclosure arranged between a pair of inductor coils.

FIG. 1 shows a schematic illustration of an inductive heating element 10 according to an embodiment of this disclosure. The inductive heating element 10 is an elongate, tubular element, having a circular transverse cross-section. The inductive heating element 10 comprises a first susceptor 12, a second susceptor 14, and a separation 15 between the first susceptor 12 and the second susceptor 14. The first susceptor 12 and the second susceptor 14 are each elongate, tubular elements having a circular transverse cross-section. The first susceptor 12 and the second susceptor 14 are coaxially aligned, end-to-end, along a longitudinal axis A-A.

The inductive heating element 10 comprises a cylindrical cavity 20, open at both ends, defined by an inner surfaces of the first susceptor 12 and the second susceptor 14. The cavity 20 is configured to receive a portion of a cylindrical aerosol-generating article (not shown), comprising an aerosol-forming substrate, such that an outer surface of the aerosol-generating article may be heated by the first susceptor and the second susceptor, thereby heating the aerosol-forming substrate.

The cavity 20 comprises three portions, a first portion 22 at a first end, defined by an inner surface of the tubular first susceptor 12, a second portion 24 at a second end, opposite the first end, defined by an inner surface of the tubular second susceptor 14, and an intermediate portion 26, bounded by the separation 15 between the first susceptor 12 and the second susceptor 14. The first susceptor 12 is arranged to heat a first portion of an aerosol-generating article received in the first portion 22 of the cavity 20, and the second susceptor 14 is arranged to heat a second portion of an aerosol-generating article received in the second portion 24 of the cavity 20.

A first inductor coil 32 is disposed around the first susceptor 12, and extends substantially the length of the first susceptor 12. As such, the first susceptor 12 is circumscribed by the first inductor coil 32 substantially along its length. When a varying electric current is supplied to the first inductor coil 32, the first inductor coil 32 generates a varying magnetic field that is concentrated in the first portion 22 of the cavity 20. Such a varying magnetic field generated by the first inductor coil 32 induces eddy currents in the first susceptor 12, causing the first susceptor 12 to be heated.

A second inductor coil 34 is disposed around the second susceptor 14, and extends substantially the length of the second susceptor 14. As such, the second susceptor 14 is circumscribed by the second inductor coil 34 substantially along its length. When a varying electric current is supplied to the second inductor coil 34, the second inductor coil 34 generates a varying magnetic field that is concentrated in the second portion 24 of the cavity 20. Such a varying magnetic field generated by the second inductor coil 34 induces eddy currents in the second susceptor 14, causing the second susceptor 14 to be heated.

The separation 15 between the first susceptor 12 and the second susceptor 14 provides a space between the first susceptor 12 and the second susceptor 14 that is not heated by induction when exposed to a varying magnetic field generated by either the first inductor coil 32 or the second inductor coil 34. Furthermore, the separation 15 thermally insulates the second susceptor 14 from the first susceptor 12, such that there is a reduced rate of heat transfer between the first susceptor 12 and the second susceptor 14, compared to an inductive heating element in which the first susceptor and the second susceptor are arranged adjacent each other, in direct thermal contact. As a result, providing the separation 15 between the first susceptor 12 and the second susceptor 14 enables selective heating of the first portion 22 of the cavity 20 by the first susceptor 12 with minimal heating of the second portion 24 of the cavity 20, and enables selective heating of the second portion 24 of the cavity 20 by the second susceptor 14 with minimal heating of the first portion 22 of the cavity 20.

The first susceptor 12 and the second susceptor 14 may be heated simultaneously by simultaneously supplying a varying electric current to the first inductor coil 32 and the second inductor coil 34. Alternatively, the first susceptor 12 and the second susceptor 14 may be heated independently or alternately by supplying a varying electric current to the first inductor coil 32 without supplying a current to the second inductor coil 34, and by subsequently supplying a varying electric current to the second inductor coil 34 without supplying a current to the first inductor coil 32. It is also envisaged that a varying electric current may be supplied to the first inductor coil 32 and the second inductor coil 34 in a sequence.

Figure 2:
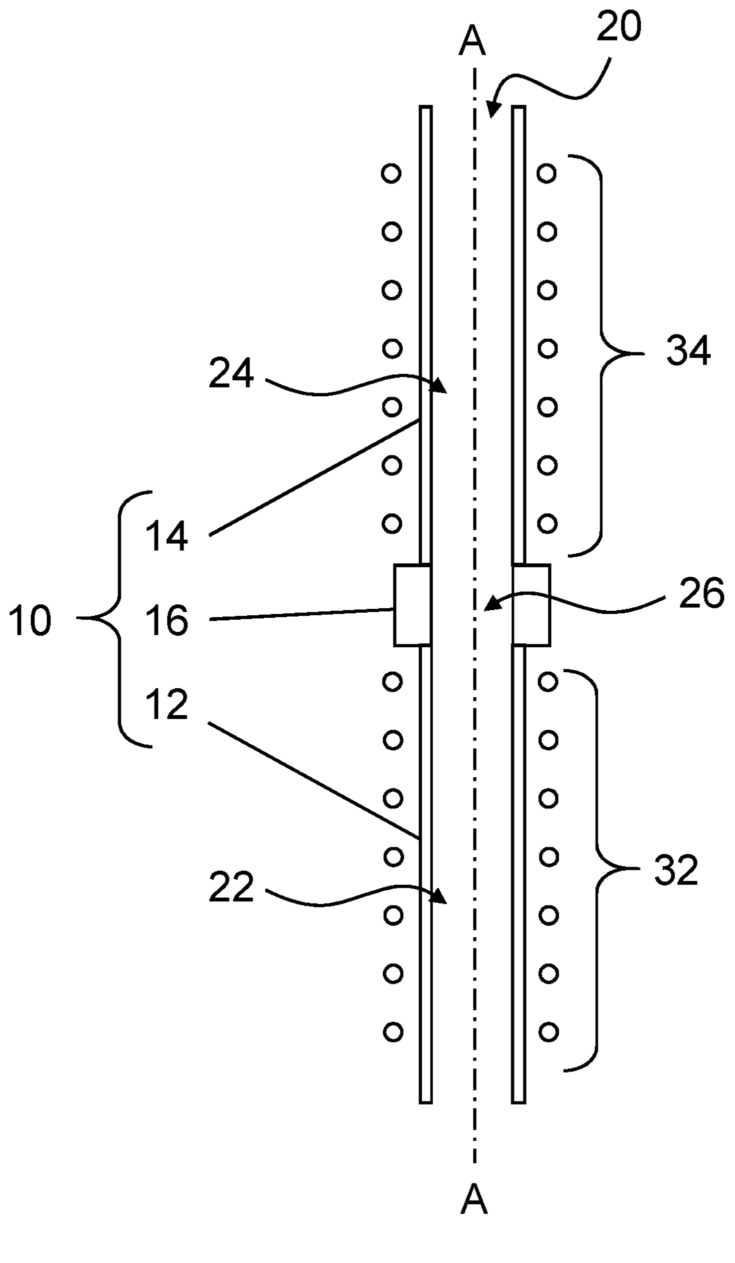
FIG. 2 shows a schematic illustration of an inductive heating element according to an embodiment of this disclosure arranged between a pair of inductor coils.

FIG. 2 shows a schematic illustration of an inductive heating element according to another embodiment of this disclosure. The inductive heating element shown in FIG. 2 is substantially identical to the inductive heating element shown in FIG. 1, and like reference numerals are used to describe like features.

The inductive heating element 10 of FIG. 2 is an elongate, tubular element, having a circular transverse cross-section. The inductive heating element 10 comprises a first susceptor 12, a second susceptor 14. The difference between the inductive heating element 10 of FIG. 1 and the inductive heating element 10 of FIG. 2 is that the inductive heating element 10 of FIG. 2 comprises an intermediate element 16 disposed between the first susceptor 12 and the second susceptor 14. In the embodiment of FIG. 2, there is still a separation between the first susceptor 12 and the second susceptor 14, however, the separation is filled by the intermediate element 16. In this embodiment, the intermediate element 16 is secured to an end of the first susceptor 12 and is also secured to an end of the second susceptor 14. Securing the intermediate element 16 to an end of the first susceptor 12, and securing the intermediate element 16 to an end of the second susceptor 14, indirectly connects the first susceptor 12 to the second susceptor 14. Advantageously, indirectly securing the first susceptor 12 to the second susceptor 14 enables the inductive heating element to form a unitary structure.

The intermediate element 16 comprises a thermally insulative material. The thermally insulative material is also electrically insulative. In this embodiment, the intermediate element 16 is formed from a polymeric material, such as PEEK. As such, the intermediate element 16 between the first susceptor 12 and the second susceptor 14 provides a space between the first susceptor 12 and the second susceptor 14 that is not heated by induction when exposed to a varying magnetic field generated by either the first inductor coil 32 or the second inductor coil 34. Furthermore, the intermediate element 16 thermally insulates the second susceptor 14 from the first susceptor 12, such that there is a reduced rate of heat transfer between the first susceptor 12 and the second susceptor 14, compared to an inductive heating element in which the first susceptor and the second susceptor are arranged adjacent each other, in direct thermal contact. The intermediate element 16 may also further reduce the rate of heat transfer between the first susceptor 12 and the second susceptor 14 compared to the separation 15 of the inductive heating element 10 of FIG. 1. As a result, providing the intermediate element 16 between the first susceptor 12 and the second susceptor 14 enables selective heating of the first portion 22 of the cavity 20 by the first susceptor 12 with minimal heating of the second portion 24 of the cavity 20, and enables selective heating of the second portion 24 of the cavity 20 by the second susceptor 14 with minimal heating of the first portion 22 of the cavity 20.

FIGS. 3 to 7 show schematic illustrations of an aerosol-generating system according to an embodiment of the present disclosure. The aerosol-generating system comprises an aerosol-generating device 100 and an aerosol-generating article 200. The aerosol-generating device 100 comprises an inductive heating arrangement 110 according to the present disclosure. The inductive heating arrangement 110 comprises an inductive heating element 120 according to the present disclosure.

Figure 3:
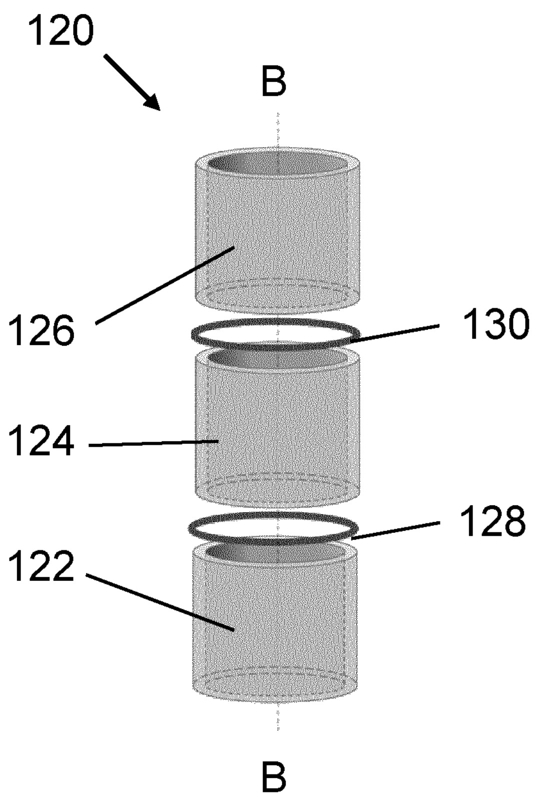
FIG. 3 shows an exploded perspective view of an inductive heating element according to an embodiment of this disclosure.
Figure 4:
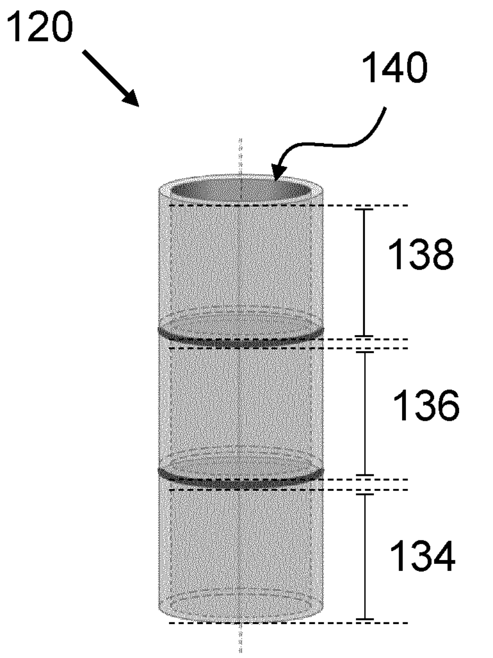
FIG. 4 shows a perspective view of the inductive heating element of FIG. 3.

FIGS. 3 and 4 show schematic illustrations of the inductive heating element 120. The inductive heating element 120 comprises: a first susceptor 122, a second susceptor 124, a third susceptor 126, a first intermediate element 128 and a second intermediate element 130. The first intermediate element 128 is disposed between the first susceptor 122 and the second susceptor 124. The second intermediate element 130 is disposed between the second susceptor 124 and the third susceptor 126.

In this embodiment, each of the first susceptor 122, the second susceptor 124 and the third susceptor 126 are identical. Each susceptor 122, 124, 126 is an elongate tubular susceptor, defining an inner cavity. Each susceptor, and its corresponding inner cavity, are substantially cylindrical, having a circular transverse cross-section that is constant along the length of the susceptor. The inner cavity of the first susceptor 122 defines a first region 134. The inner cavity of the second susceptor 124 defines a second region 136. The inner cavity of the third susceptor defines a third region 138.

Similarly, the first intermediate element 128 and the second intermediate element 130 are identical. The intermediate elements 128, 130 are tubular, defining an inner cavity. Each intermediate element 128, 130 is substantially cylindrical, having a circular transverse cross-section that is constant along the length of the intermediate element. The outer diameter of the intermediate elements 128, 130 is identical to the outer diameter of the susceptors 122, 124, 126, such that the outer surface of the intermediate elements 128, 130 may be aligned flush with the outer surface of the susceptors 122, 124, 126. The inner diameter of the intermediate elements 128, 130 is also identical to the inner diameter of the susceptors 122, 124, 126, such that the inner surface of the intermediate elements 128, 138 may be aligned flush with the inner surface of the susceptors 122, 124, 126.

The first susceptor 122, the first intermediate element 128, the second susceptor 124, the second intermediate element 130 and the third susceptor 126 are arranged end-to-end, and coaxially aligned on an axis B-B. In this arrangement, the susceptors 122, 124, 126 and the intermediate elements 128, 130 form a tubular, elongate, cylindrical structure. This structure forms the inductive heating element 120 in accordance with an embodiment of the present disclosure.

The elongate tubular inductive heating element 120 comprises an inner cavity 140. The inductive heating element cavity 140 is defined by the inner cavities of the susceptors 122, 124, 126 and the inner cavities of the intermediate elements 128, 130. The inductive heating element cavity 140 is configured to receive an aerosol-generating segment of the aerosol-generating article 200, as described in more detail below.

The intermediate elements 128, 130 are formed from an electrically insulative and thermally insulative material. As such, the susceptors 122, 124, 126 are substantially electrically and thermally insulated from each other. The material of the intermediate elements 128, 130 is also substantially impermeable to gas. In this embodiment, the tubular inductive heating element 120 is substantially impermeable to gas from an outer surface to an inner surface defining the inductive heating element cavity 140.

FIGS. 5, 6 and 7 show schematic cross-sections of the aerosol-generating device 100 and the aerosol-generating article 200.

The aerosol-generating device 100 comprises a substantially cylindrical device housing 102, with a shape and size similar to a conventional cigar. The device housing 102 defines a device cavity 104 at a proximal end. The device cavity 104 is substantially cylindrical, open at a proximal end, and substantially closed at a distal end, opposite the proximal end. The device cavity 104 is configured to receive the aerosol-generating segment 210 of the aerosol-generating article 200. Accordingly, the length and diameter of the device cavity 104 are substantially similar to the length and diameter of the aerosol-generating segment 210 of the aerosol-generating article 200.

The aerosol-generating device 100 further comprises a power supply 106, in the form of a rechargeable nickel—cadmium battery, a controller 108 in the form of a printed circuit board including a microprocessor, an electrical connector 109, and the inductive heating arrangement 110. The power supply 106, controller 108 and inductive heating arrangement 110 are all housed within the device housing 102. The inductive heating arrangement 110 of the aerosol-generating device 100 is arranged at the proximal end of the device 100, and is generally disposed around the device cavity 104. The electrical connector 109 is arranged at a distal end of the device housing 109, opposite the device cavity 104.

The controller 108 is configured to control the supply of power from the power supply 106 to the inductive heating arrangement 110. The controller 108 further comprises a DC/AC inverter, including a Class-D power amplifier, and is configured to supply a varying current to the inductive heating arrangement 110. The controller 108 is also configured to control recharging of the power supply 106 from the electrical connector 109. In addition, the controller 108 comprises a puff sensor (not shown) configured to sense when a user is drawing on an aerosol-generating article received in the device cavity 104.

The inductive heating arrangement 110 comprises three inductive heating units, including a first inductive heating unit 112, a second inductive heating unit 114 and a third inductive heating unit 116. The first inductive heating unit 112, second inductive heating unit 114 and third inductive heating unit 116 are substantially identical.

The first inductive heating unit 112 comprises a cylindrical, tubular first inductor coil 150, a cylindrical, tubular first flux concentrator 152 disposed about the first inductor coil 150 and a cylindrical, tubular first inductor unit housing 154 disposed about the first flux concentrator 152.

The second inductive heating unit 114 comprises a cylindrical, tubular second inductor coil 160, a cylindrical, tubular second flux concentrator 162 disposed about the second inductor coil 160 and a cylindrical, tubular second inductor unit housing 164 disposed about the second flux concentrator 162.

The third inductive heating unit 116 comprises a cylindrical, tubular third inductor coil 170, a cylindrical, tubular third flux concentrator 172 disposed about the third inductor coil 170 and a cylindrical, tubular third inductor unit housing 174 disposed about the third flux concentrator 172.

Accordingly, each inductive heating unit 112, 114, 116 forms a substantially tubular unit with a circular transverse cross-section. In each inductive heating unit 112, 114, 116, the flux concentrator extends over the proximal and distal ends of the inductor coil, such that the inductor coil is arranged within an annular cavity of the flux concentrator. Similarly, each inductive heating unit housing extends over the proximal and distal ends of the flux concentrator, such that the flux concentrator and inductor coil are arranged within an annular cavity of the inductive heating unit housing. This arrangement enables the flux concentrator to concentrate the magnetic field generated by the inductor coil in the inner cavity of the inductor coil. This arrangement also enables the inductor unit housing to retain the flux concentrator and inductor coil within the inductor unit housing.

The inductive heating arrangement 110 further comprises the inductive heating element 120. The inductive heating element 120 is disposed about the inner surface of the device cavity 104. In this embodiment, the device housing 102 defines an inner surface of the device cavity 104. However, it is envisaged that in some embodiments the inner surface of the device cavity is defined by the inner surface of the inductive heating element 120.

The inductive heating units 112, 114, 116 are disposed about the inductive heating element 120, such that the inductive heating element 120 and the inductive heating units 112, 114, 116 are concentrically arranged about the device cavity 104. The first inductive heating unit 112 is disposed about the first susceptor 122, at a distal end of the device cavity 104. The second inductive heating unit 114 is disposed about the second susceptor 124, at a central portion of the device cavity 104. The third inductive heating unit 116 is disposed about the third susceptor 126, at a proximal end of the device cavity 104. It is envisaged that in some embodiments the flux concentrators may also extend into the intermediate elements of the inductive heating element, in order to further distort the magnetic fields generated by the inductor coils towards the susceptors.

The first inductor coil 150 is connected to the controller 108 and the power supply 106, and the controller 108 is configured to supply a varying electric current to the first inductor coil 150. When a varying electric current is supplied to the first inductor coil 150, the first inductor coil 150 generates a varying magnetic field, which heats the first susceptor 122 by induction.

The second inductor coil 160 is connected to the controller 108 and the power supply 106, and the controller 108 is configured to supply a varying electric current to the second inductor coil 160. When a varying electric current is supplied to the second inductor coil 160, the second inductor coil 160 generates a varying magnetic field, which heats the second susceptor 124 by induction.

The first inductor coil 170 is connected to the controller 108 and the power supply 106, and the controller 108 is configured to supply a varying electric current to the third inductor coil 170. When a varying electric current is supplied to the third inductor coil 170, the third inductor coil 170 generates a varying magnetic field, which heats the third susceptor 126 by induction.

The device housing 102 also defines an air inlet 180 in close proximity to the distal end of the device cavity 106. The air inlet 180 is configured to enable ambient air to be drawn into the device housing 102. An airflow pathway 181 is defined through the device, between the air inlet 180 and an air outlet in the distal end of the device cavity 104, to enable air to be drawn from the air inlet 180 into the device cavity 104.

The aerosol-generating article 200 is generally in the form of a cylindrical rod, having a diameter similar to the inner diameter of the device cavity 104. The aerosol-generating article 200 comprises a cylindrical cellulose acetate filter plug 204 and a cylindrical aerosol-generating segment 210 wrapped together by an outer wrapper 220 of cigarette paper.

The filter plug 204 is arranged at a proximal end of the aerosol-generating article 200, and forms the mouthpiece of the aerosol-generating system on which a user draws to receive aerosol generated by the system.

The aerosol-generating segment 210 is arranged at a distal end of the aerosol-generating article 200, and has a length substantially equal to the length of the device cavity 104. The aerosol-generating segment 210 comprises a plurality of aerosol-forming substrates, including: a first aerosol-forming substrate 212 at a distal end of the aerosol-generating article 200, a second aerosol-forming substrate 214 adjacent the first aerosol-forming substrate 212, and a third aerosol-forming substrate 216 at a proximal end of the aerosol-generating segment 210, adjacent the second aerosol-forming substrate 216. It will be appreciated that in some embodiments two or more of the aerosol-forming substrates may be formed from the same materials. However, in this embodiment each of the aerosol-forming substrates 212, 214, 216 is different. The first aerosol-forming substrate 212 comprises a gathered and crimped sheet of homogenised tobacco material, without additional flavourings. The second aerosol-forming substrate 214 comprises a gathered and crimped sheet of homogenised tobacco material including a flavouring in the form of menthol. The third aerosol-forming substrate comprises a flavouring in the form of menthol, and does not comprise tobacco material or any other source of nicotine. Each of the aerosol-forming substrates 212, 214, 216 also comprises further components, such as one or more aerosol formers and water, such that heating the aerosol-forming substrate generates an aerosol with desirable organoleptic properties.

The proximal end of the first aerosol-forming substrate 212 is exposed, as it is not covered by the outer wrapper 220. In this embodiment, air is able to be drawn into the aerosol-generating segment 210 via the proximal end of the first aerosol-forming substrate 212, at the proximal end of the article 200.

In this embodiment, the first aerosol-forming substrate 212, the second aerosol-forming substrate 214 and the third aerosol-forming substrate 216 are arranged end-to-end. However, it is envisaged that in other embodiments, a separation may be provided between the first aerosol-forming substrate and the second aerosol-forming substrate, and a separation may be provided between the second aerosol-forming substrate and the third aerosol-forming substrate.

As shown in FIG. 7, when the aerosol-generating segment 210 of the aerosol-generating article 200 is received in the device cavity 104, the length of the first aerosol-forming substrate 212 is such that the first aerosol-forming substrate 212 extends from the distal end of the device cavity 104, through the first region 134 of the first susceptor 122, and to the first intermediate member 128. The length of the second aerosol-forming substrate 214 is such that the second aerosol-forming substrate 214 extends from the first intermediate member 128, through the second region 136 of the second susceptor 124, and to the second intermediate member 130. The length of the third aerosol-forming substrate 216 is such that the third aerosol-forming substrate 216 extends from the second intermediate member 130 to the proximal end of the device cavity 104.

In use, when an aerosol-generating article 200 is received in the device cavity 104, a user may draw on the proximal end of the aerosol-generating article 200 to inhale aerosol generated by the aerosol-generating system. When a user draws on the proximal end of the aerosol-generating article 200, air is drawn into the device housing 102 at the air inlet 180, and is drawn along the airflow pathway 181, into the device cavity 104. The air is drawn into the aerosol-generating article 200 at the proximal end of the first aerosol-forming substrate 212 through the outlet in the distal end of the device cavity 104.

In this embodiment, the controller 108 of the aerosol-generating device 100 is configured to supply power to the inductor coils of the inductive heating arrangement 110 in a predetermined sequence. The predetermined sequence comprises supplying a varying electric current to the first inductor coil 150 during a first draw from the user, subsequently supplying a varying electric current to the second inductor coil 160 during a second draw from the user, after the first draw has finished, and subsequently supplying a varying electric current to the third inductor coil 170 during a third draw from the user, after the second draw has finished. On the fourth draw, the sequence starts again at the first inductor coil 150. This sequence results in heating of the first aerosol-forming substrate 212 on a first puff, heating of the second aerosol-forming substrate 214 on a second puff, and heating of the third aerosol-forming substrate 216 on a third puff. Since the aerosol forming substrates 212, 214, 216 of the article 100 are all different, this sequence results in a different experience for a user on each puff on the aerosol-generating system.

It will be appreciated that the controller 108 may be configured to supply power to the inductor coils in a different sequence, or simultaneously, depending on the desired delivery of aerosol to the user. In some embodiments, the aerosol-generating device may be controllable by the user to change the sequence.

FIG. 8 shows an inductive heating arrangement according to another embodiment of the present invention. The inductive heating arrangement 300 comprises two modular inductive heating units, a first inductive heating unit 310 and a second inductive heating unit 360. The modular inductive heating units 310, 360 are identical, independent units that are individually removable and replaceable in the inductive heating arrangement 300. Providing such modular inductive heating units enables an inductive heating arrangement to be relatively inexpensive and straightforward to manufacture. This is because it may be easier to standardise manufacturing of separate, modular inductive heating units, rather than an entire inductive heating arrangement. Providing such modular inductive heating units may also enable an inductive heating assembly to be easily customisable.

The first inductive heating unit 310 generally comprises a tubular first susceptor 312, a tubular first inductor coil 314, a tubular first flux concentrator 316 and a tubular first inductive heating unit housing 318.

The first susceptor 312 comprises a tubular support body 320, formed from an electrically insulative and thermally insulative material, such as alumina, and a susceptor layer 322 on an inner surface of the tubular support body 320. Intermediate elements 324 are provided at each end of the tubular support body 320, overlapping the ends of the susceptor layer 322. The intermediate elements 324 are also formed from an electrically insulative and thermally insulative material, such as alumina.

The first inductor coil 314 is disposed around the outer surface of the first susceptor 312, and extends substantially the length of the first susceptor 312. Each end 326 of the first inductor coil 312 extends through the first flux concentrator 316 and housing 318, to an outer surface of the first inductive heating unit 310, such that the first inductor coil 314 may be connected to a power supply and supplied with a varying current.

The first flux concentrator 316 is disposed around the outer surface of the tubular first inductor coil 314, and extends over the ends of the first inductor coil 314 and the first susceptor 312, but not beyond the inner surface of the first susceptor 312. The intermediate elements 324 are disposed between the first susceptor 312 and the first flux concentrator 316, and electrically insulate the susceptor layer of the first susceptor 312 from the first flux concentrator 316.

The first inductive heating unit housing 318 extends around the outer surface of the first flux concentrator 316, over the ends of the flux concentrator 316, and over the inner surface of the first flux concentrator 316. The first inductive heating unit housing 318 also extends over the intermediate elements 324 of the first susceptor 312, such that the first susceptor 312, first inductor coil 314 and first flux concentrator 316 are held together. In this way, the first susceptor 312, first inductor coil 314, first flux concentrator 316 and first inductive heating unit housing 318 form a tubular unit, having an inner cavity that is able to receive aerosol-forming substrate. The first inductive heating unit housing 318 is formed from an electrically insulative and thermally insulative material. In this embodiment, the first inductive unit housing 318 is formed from a polymer, such as PEEK, that is injection moulded over the first susceptor 312, first inductor coil 314 and first flux concentrator 316.

The second inductive heating unit 360 generally comprises a tubular second susceptor 362, a tubular second inductor coil 364, a tubular second flux concentrator 366 and a tubular second inductive heating unit housing 368.

The second susceptor 362 comprises a tubular support body 370, formed from an electrically insulative and thermally insulative material, such as PEEK, and a susceptor layer 372 on an inner surface of the tubular support body 370. Intermediate elements 374 are provided at each end of the tubular support body 370, overlapping the ends of the susceptor layer 372. The intermediate elements 374 are also formed from an electrically insulative and thermally insulative material, which in this embodiment is a ceramic material, such as zirconium dioxide (ZrO2).

The second inductor coil 364 is disposed around the outer surface of the second susceptor 362, and extends substantially the length of the second susceptor 362. Each end 376 of the second inductor coil 362 extends through the second flux concentrator 366 and housing 368, to an outer surface of the second inductive heating unit 360, such that the second inductor coil 364 may be connected to a power supply and supplied with a varying current.

The second flux concentrator 366 is disposed around the outer surface of the tubular second inductor coil 364, and extends over the ends of the second inductor coil 364 and the second susceptor 362, but not beyond the inner surface of the second susceptor 362. The intermediate elements 374 are disposed between the second susceptor 362 and the second flux concentrator 366, and electrically insulate the susceptor layer of the second susceptor 362 from the second flux concentrator 366.

The second inductive heating unit housing 368 extends around the outer surface of the second flux concentrator 366, over the ends of the flux concentrator 366, and over the inner surface of the second flux concentrator 366. The second inductive heating unit housing 368 also extends over the intermediate elements 374 of the second susceptor 362, such that the second susceptor 362, second inductor coil 364 and second flux concentrator 366 are held together. In this way, the second susceptor 362, second inductor coil 364, second flux concentrator 366 and second inductive heating unit housing 368 form a tubular unit, having an inner cavity that is able to receive aerosol-forming substrate. The second inductive heating unit housing 368 is formed from an electrically insulative and thermally insulative material. In this embodiment, the second inductive unit housing 368 is formed from a polymer, such as PEEK, that is injection moulded over the second susceptor 362, second inductor coil 364 and second flux concentrator 366.

The second inductive heating unit 360 is stacked on top of the first inductive heating unit 310 to form the inductive heating arrangement 300. The inductive heating arrangement 300 generally forms a tubular unit defining an inner cavity 380 for receiving aerosol-forming substrate.

When the second inductive heating unit 360 is stacked on top of the first inductive heating unit 310, there is a separation between the first susceptor 312 and the second susceptor 362. The separation comprises an intermediate element 324, 374 from each of the first and second inductive heating units 310, 360, and end portions of the flux concentrator 316, 366 and inductive heating unit housing 318, 368 from each of the first and second inductive heating units 310, 360. Such a separation provides effective thermal insulation and electrical insulation between the susceptor layer 322 of the first susceptor 312 and the susceptor layer 372 of the second susceptor 362.

It will be appreciated that the embodiments described above are specific examples only, and other embodiments are envisaged in accordance with this disclosure.

The invention claimed is:

1. An inductive heating element for an aerosol-generating system, the inductive heating element comprising:

a first susceptor, the first susceptor being a tubular susceptor defining an inner cavity configured to receive an aerosol-forming substrate;

a second susceptor, the second susceptor being a tubular susceptor defining an inner cavity configured to receive aerosol-forming substrate; and a separation between the first susceptor and the second susceptor, the separation thermally insulating the first susceptor from the second susceptor, wherein the second susceptor differs from the first susceptor in at least one characteristic, wherein the first susceptor has a sidewall and the first susceptor is substantially impermeable to gas through the sidewall, and wherein the second susceptor has a sidewall and the second susceptor is substantially impermeable to gas through the sidewall.

2. The inductive heating element according to claim 1, further comprising an intermediate element disposed between the first susceptor and the second susceptor, the intermediate element comprising a thermally insulative material configured to thermally insulate the first susceptor from the second susceptor.

3. The inductive heating element according to claim 2, wherein the intermediate element comprises an electrically insulative material configured to electrically insulate the first susceptor from the second susceptor.

4. The inductive heating element according to claim 2, wherein the intermediate element is a tubular intermediate element defining an inner cavity.

5. The inductive heating element according to claim 2, wherein the intermediate element is secured to an end of the first susceptor.

6. The inductive heating element according to claim 5, wherein the intermediate element is secured to an end of the second susceptor.

7. The inductive heating element according to claim 1, wherein the first susceptor comprises a tubular support body formed from a thermally insulative material and a susceptor layer on an inner surface of the tubular support body, and wherein the second susceptor comprises a tubular support body formed from a thermally insulative material and a susceptor layer on an inner surface of the tubular support body.

8. The inductive heating element according to claim 1, wherein the second susceptor differs from the first susceptor in that the second susceptor is formed from a different material than the first susceptor.

9. The inductive heating element according to claim 1, wherein the second susceptor differs from the first susceptor in that the second susceptor has a different shape and dimensions from the first susceptor.

10. The inductive heating element according to claim 1, wherein the second susceptor differs from the first susceptor in that the second susceptor has a length that is longer than a length of the first susceptor.

11. The inductive heating element according to claim 1, wherein the inductive heating element comprises a single inner cavity for receiving aerosol- forming substrate, and wherein the inner cavity of the first susceptor defines a portion of the single inner cavity of the inductive heating element, and wherein the inner cavity of the second susceptor defines a portion of the single inner cavity of the inductive heating element.

12. An inductive heating arrangement, comprising:

an inductive heating element according to claim 1;

a first inductor coil; and a second inductor coil, wherein the first inductor coil is arranged relative to the inductive heating element such that a varying electric current supplied to the first inductor coil generates a varying magnetic field that heats the first susceptor of the inductive heating element, and wherein the second inductor coil is arranged relative to the inductive heating element such that a varying electric current supplied to the second inductor coil generates a varying magnetic field that heats the second susceptor of the inductive heating element.

13. The inductive heating arrangement according to claim 12, wherein the first inductor coil is a tubular coil having an inner cavity, the first susceptor being arranged within the inner cavity of the first inductor coil, and wherein the second inductor coil is a tubular coil having an inner cavity, the second susceptor being arranged within the inner cavity of the second inductor coil.

14. The inductive heating arrangement according to claim 13, further comprising a flux concentrator disposed around the first inductor coil and the second inductor coil, the flux concentrator being configured to distort the varying magnetic field generated by the first inductor coil towards the first susceptor and to distort the varying magnetic field generated by the second inductor coil towards the second susceptor.

15. The inductive heating arrangement according to claim 14, wherein a portion of the flux concentrator extends into an intermediate element between the first susceptor and the second susceptor.

16. The inductive heating arrangement according to claim 13, further comprising:

a first flux concentrator disposed around the first inductor coil, the first flux concentrator being configured to distort the varying magnetic field generated by the first inductor coil towards the first susceptor; and a second flux concentrator disposed around the second inductor coil, the second flux concentrator being configured to distort the varying magnetic field generated by the second inductor coil towards the second susceptor.

17. The inductive heating arrangement according to claim 16, wherein at least one of:

a portion of the first flux concentrator extends into an intermediate element between the first susceptor and the second susceptor, and a portion of the second flux concentrator extends into the intermediate element between the first susceptor and the second susceptor.

18. An aerosol-generating device, comprising an inductive heating arrangement according to claim 12.

19. An aerosol-generating device, comprising:

a device housing defining a device cavity configured to receive an aerosol-forming substrate;

an inductive heating arrangement including:

an inductive heating element comprising:

a first susceptor disposed around a first portion of the device cavity, wherein the first susceptor has a sidewall and the first susceptor is substantially impermeable to gas through the sidewall, a second susceptor disposed around a second portion of the device cavity, wherein the second susceptor has a sidewall and the second susceptor is substantially impermeable to gas through the sidewall, and wherein the second susceptor differs from the first susceptor in at least one characteristic, and a separation between the first susceptor and the second susceptor, the separations thermally insulating the first susceptor from the second susceptor;

a first inductor coil disposed around at least a portion of the first susceptor and the first portion of the device cavity; and a second inductor coil disposed around at least a portion of the second susceptor and the second portion of the device cavity; and a power supply connected to the inductive heating arrangement and configured to provide a varying electric current to the first inductor coil and the second inductor coil, wherein:

when the varying electric current is supplied to the first inductor coil, the first inductor coil generates a varying magnetic field that heats the first susceptor, and when the varying electric current is supplied to the second inductor coil, the second inductor coil generates a varying magnetic field that heats the second susceptor.

20. An aerosol-generating system, comprising:

an aerosol-generating article comprising:

a first aerosol-forming substrate, and a second aerosol-forming substrate; and an aerosol-generating device as claimed in claim 19, wherein when the aerosol-generating article is received in the device cavity, at least a portion of the first aerosol-forming substrate is received in the first portion of the device cavity and at least a portion of the second aerosol-forming substrate is received in the second portion of the device cavity.

* * * * *